(12) United States Patent
Shinnae

(10) Patent No.: US 10,908,858 B2
(45) Date of Patent: Feb. 2, 2021

(54) IMAGE FORMING APPARATUS, INFORMATION PROCESSING APPARATUS, AND COMPUTER PROGRAM

(71) Applicant: CANON KABUSHIKI KAISHA, Tokyo (JP)

(72) Inventor: Toru Shinnae, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/601,071

(22) Filed: Oct. 14, 2019

(65) Prior Publication Data
US 2020/0125308 A1   Apr. 23, 2020

(30) Foreign Application Priority Data
Oct. 17, 2018   (JP) .................................. 2018-195878

(51) Int. Cl.
| | |
|---|---|
| B65H 7/00 | (2006.01) |
| G06F 3/048 | (2013.01) |
| G06F 3/0486 | (2013.01) |
| G06F 3/12 | (2006.01) |
| B65H 5/00 | (2006.01) |

(52) U.S. Cl.
CPC ........... *G06F 3/1256* (2013.01); *B65H 5/006* (2013.01); *G06F 3/126* (2013.01); *G06F 3/1258* (2013.01)

(58) Field of Classification Search
USPC .............. 358/1.1–3.29, 1.11–1.18, 450–453; 715/200–210, 730–732, 799, 856–866; 345/629–633, 173, 952
See application file for complete search history.

(56) References Cited

U.S. PATENT DOCUMENTS

| | | | | |
|---|---|---|---|---|
| 2008/0186522 A1* | 8/2008 | Tsuji | .................. | G03G 15/6547 358/1.12 |
| 2015/0138232 A1* | 5/2015 | Sugimoto | .......... | H04N 1/00408 345/633 |
| 2015/0314978 A1* | 11/2015 | Miyajima | .............. | G03B 27/52 271/298 |
| 2018/0334351 A1* | 11/2018 | Fujita | ..................... | G06F 3/1203 |
| 2018/0335741 A1* | 11/2018 | Shinnae | ............. | G03G 15/5091 |
| 2018/0335983 A1* | 11/2018 | Oba | .................... | H04N 1/00477 |
| 2019/0377990 A1 | 12/2019 | Miyahara et al. | | |

FOREIGN PATENT DOCUMENTS

JP   2013-146898 A   8/2013

* cited by examiner

*Primary Examiner* — Marcellus J Augustin
(74) *Attorney, Agent, or Firm* — Venable LLP

(57) ABSTRACT

An image forming apparatus is capable of easily changing a scheduled stacking position of any image forming job. An image region in which an overall arrangement mode of the image forming apparatus and sheet discharge apparatus is displayed and a list region in which standby jobs are listed are displayed on a monitor screen. In the image region, a sheet bundle of the selected standby job is displayed on a tray that is set as the scheduled stacking position of the selected standby job. When the sheet bundle is selected and dragged and dropped by a mouse pointer on the monitor screen, the tray being set as the scheduled stacking position is changed, and a position at which the sheet bundle is displayed is also changed.

13 Claims, 15 Drawing Sheets

IMAGE FORMING APPARATUS, INFORMATION PROCESSING APPARATUS, AND COMPUTER PROGRAM

BACKGROUND OF THE INVENTION

Field of the Invention

The present disclosure relates to an image forming apparatus to which a plurality of sheet discharge apparatus are mountable, and also relates to an information processing apparatus.

Description of the Related Art

There are known service forms for image formation called "print on demand (POD)" and "production printing". In such service forms, for example, small-lot and large-variety printing orders are received from customers. Then, images are formed quickly with use of an image forming apparatus operated at high speed to be delivered.

Further, in such an environment, not only one image forming apparatus but a plurality of image forming apparatus are installed. An operator uses a different image forming apparatus depending on the case to perform printing. At this time, images are rapidly formed onto a large number of sheets (sheet-like media, the same applies in the following), and the sheets are discharged. A large-capacity stacker is prepared at a sheet discharge destination. The large-capacity stacker of this type stacks several thousands of sheets at one time. A plurality of large-capacity stackers may be mounted so that, even when one large-capacity stacker is full, image formation can be continued by automatically switching a sheet discharge destination to another large-capacity stacker. In this case, sheets having images formed thereon and corresponding to the one image forming job are discharged to a plurality of sheet discharge destinations in a divided manner. In the following description, the "sheet having an image formed thereon" is simply referred to as "sheet" in some cases. Further, a bundle of sheets is referred to as "sheet bundle" in some cases.

Meanwhile, the operator performs printing as follows. While checking the sheet discharge state of the image forming apparatus, the operator determines where to discharge the sheet or the sheet bundle for the next image forming job so that occurrence of a downtime is prevented. Where to discharge the sheet or the sheet bundle is set by opening a screen for a print setting of the image forming job, and setting a sheet discharge destination at which the number of stacked sheets is relatively small. At this time, the operator is required to memorize which sheet discharge destination is available and what apparatus is present at the sheet discharge destination. As described above, in order to change the setting of the sheet discharge destination, a large number of procedures are required. Therefore, it is not easy to, while a large amount of sheets are discharged to various locations at high speed, recognize the available sheet discharge destination and change the print setting (sheet discharge destination setting in the print setting) of the image forming job so that the sheet or the sheet bundle is promptly discharged to the available sheet discharge destination.

In order to address this issue, in the technology described in Japanese Patent Application Laid-open No. 2013-146898, the image forming apparatus receives a request for checking the sheet discharge destination for each image forming job. Then, an apparatus being the sheet discharge destination (sheet discharge apparatus, for example, the large-capacity stacker) is displayed on a predetermined display device. In this manner, the operator can check the sheet discharge destination corresponding to each image forming job, and reliably collect the sheets corresponding to a processed job.

In the technology disclosed in Japanese Patent Application Laid-open No. 2013-146898, in order to change the sheet discharge destination of the image forming job depending on the sheet discharge state, a large number of operations including opening the screen of the sheet setting are required. Therefore, it is difficult to, while a large amount of sheets are discharged to various locations at high speed, recognize the available sheet discharge destination and change the setting of the sheet discharge destination determined in advance by the image forming job so that the sheet is promptly discharged to the available sheet discharge destination.

SUMMARY OF THE INVENTION

An image forming apparatus according to the present disclosure includes: an image forming unit configured to form an image on a sheet in accordance with an image forming job; a plurality of sheet stacking units, on each of which sheets having images formed thereon, which are discharged from the image forming unit, are to be stacked; a memory configured to store a job attribute including a sheet discharge destination of the sheets having the images formed thereon; a receiving unit configured to receive a screen operation performed on a display device; and a controller, the controller being configured to: generate a configuration image by visualizing a configuration of the plurality of sheet stacking units; generate a sheet image by visualizing the job attribute of any image forming job; display the configuration image and the sheet image on the display device; and change, when a predetermined screen operation for moving the sheet image to a portion of the configuration image at which one of the plurality of sheet stacking units is displayed is received as the screen operation performed with respect to the displayed sheet image, the sheet discharge destination included in the job attribute to the one of the plurality of sheet stacking units to which the sheet image is moved.

Further features of the present invention will become apparent from the following description of exemplary embodiments (with reference to the attached drawings).

DESCRIPTION OF THE EMBODIMENTS

First Embodiment

Figure 1:
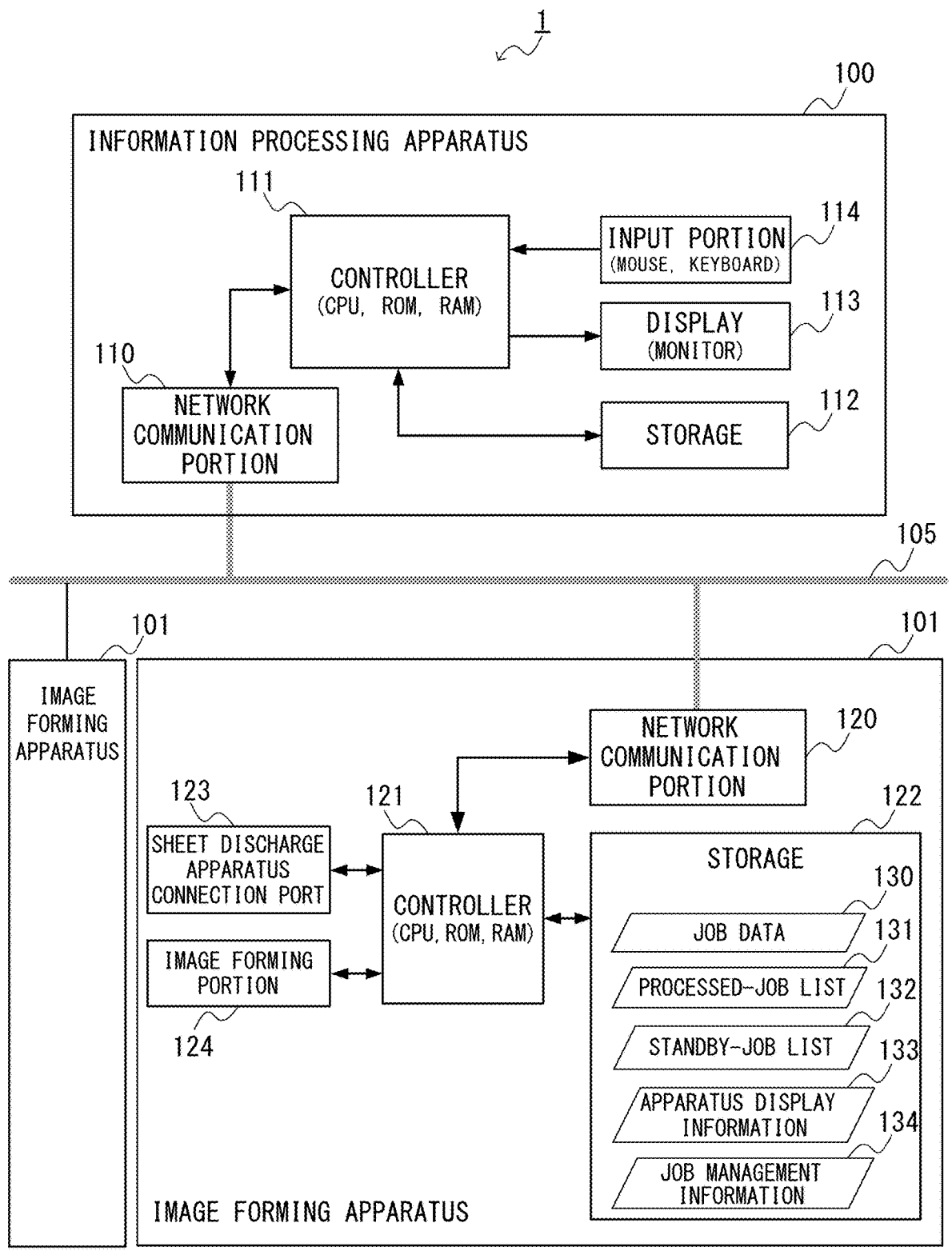
FIG. 1 is a configuration diagram of an image forming system in a first embodiment of the present disclosure.

FIG. 1 is a diagram for illustrating a schematic configuration example of an image forming system in a first embodiment of the present disclosure. An image forming system 1 includes an information processing apparatus 100 and an image forming apparatus 101, which are connected to a communication network 105. The first embodiment represents an example in which one information processing apparatus 100 and two image forming apparatus 101 are provided, but one information processing apparatus 100 and one image forming apparatus 101 may be provided, or a plurality of (larger than one) information processing apparatus 100 and a plurality of (larger than two) image forming apparatus 101 may be provided. The communication network 105 is a local area network (LAN). As the communication network 105, a wide area network (WAN), a combination of the LAN and the WAN, or a wired network may be employed instead.

The information processing apparatus 100 includes a network communication portion 110, a controller 111, and a storage 112. A display 113 and an input portion 114 are connected to the controller 111. The network communication portion 110 corresponds to a communication unit configured to control, together with the controller 111, communication to be performed between the network communication portion 110 and a communication network 105. The storage 112 corresponds to a memory configured to store large-sized data in a short or long term. In the first embodiment, in the storage 112 of the information processing apparatus 100, the image forming apparatus 101 connected for communication to the information processing apparatus 100 via the communication network 105 are registered as an image forming apparatus registration list so that the image forming apparatus 101 are managed. The display 113 corresponds to a display device including a screen for providing various types of display to an operator through control of the controller 111. In the first embodiment, the display 113 displays, for example, an overall image, a sheet image, and a list of job attributes of image forming jobs, which are to be described later. The input portion 114 corresponds to a receiving unit configured to receive a screen operation performed on the display 113. The screen operation includes a touch operation, a flick operation, a drag operation (including drag-and-drop operation), and a move operation. With those operations, various instructions, range designation, and designation of an image forming job from the operator are received.

In the first embodiment, information representing a series of image forming operations performed onto one or a plurality of sheets, which are accompanied by an instruction to start the image forming operation, is referred to as "job".

A "processed job" refers to an image forming job for which processing of image formation is finished. A "standby job" refers to an image forming job for which image formation is not executed yet. The input portion 114 also corresponds to a receiving unit configured to receive input of a selection of the processed job or the standby job, or the screen operation performed on the display 113. In the following description, the display 113 includes a "touch panel", and various selections and instructions from the operator can be input through the screen operation performed on the display 113.

The controller 111 is one type of computer including a central processing unit (CPU), a read only memory (ROM), and a random access memory (RAM). The CPU executes a computer program for apparatus control to form various functions for the information processing apparatus 100. This operation is described later. The ROM stores the above-mentioned computer program and the like. The RAM is a work memory for the CPU.

The image forming apparatus 101 includes a network communication portion 120, a controller 121, a storage 122, a sheet discharge apparatus connection port 123, and an image forming portion 124. The network communication portion 120 corresponds to a communication unit configured to control communication to be performed between the network communication portion 120 and the communication network 105, and also corresponds to a receiving unit configured to receive, by the image forming apparatus 101, information input to the information processing apparatus 100. The storage 122 is a storage unit configured to store large-sized data in a short or long term. The sheet discharge apparatus connection port 123 is a mounting unit configured to mount the sheet discharge apparatus. The image forming portion 124 is an image forming unit configured to form an image onto a sheet for each input image forming job.

The controller 121 is a computer including a CPU, a ROM, and a RAM, or may be an embedded computer. The CPU executes a computer program for image formation control to form various functions for the image forming apparatus 101 and operate as a controller configured to control an operation of each of the functions. This operation is described later. The ROM stores the above-mentioned computer program for the apparatus and the like. The RAM is a work memory for the CPU.

The storage 122 of the image forming apparatus 101 stores job data 130, a processed-job list 131, a standby job list 132, apparatus display information 133, and job management information 134. Examples of the job data 130 include image data and instruction data representing the details of the input image forming job, data obtained after execution of the image forming job, and data obtained during the process of execution of the image forming job.

The processed-job list 131 is a list storing the image forming jobs executed by the image forming apparatus 101 as the processed jobs. The processed job list 131 stores job attributes including setting information on, for example, a job ID, a job name, the number of pages, the number of bundles, a sheet (such as type and size thereof), and a sheet discharge destination or a sheet-bundle discharge destination in association with one another. The sheet discharge destination or the sheet-bundle discharge destination is information representing a sheet discharge apparatus and a sheet stacking portion that serve as a sheet discharge destination or a sheet-bundle discharge destination corresponding to the processed job. The standby job list 132 is a list storing, as the standby job, at least one image forming job for which processing of image formation is not executed yet among the image forming jobs. The standby job list 132 stores job attributes of the standby jobs in stacking order onto the sheet stacking portion. The standby job list 132 stores job attributes such as a job ID, a job name, the number of pages, the number of bundles, a sheet, and a sheet discharge destination or a sheet-bundle discharge destination in association with one another.

The apparatus display information 133 is one type of information representing the entire arrangement mode of the image forming unit and a plurality of sheet stacking units, and is referred to when an overall image to be described later is visualized. In the first embodiment, the image forming unit corresponds to the image forming apparatus 101, and the sheet stacking unit corresponds to a sheet discharge apparatus to be described later. Therefore, information representing the outer appearance, structure, and size of each of the image forming apparatus 101 and the sheet discharge apparatus, and the outer appearance, structure, and size as a whole at the time of mounting is referred to as the apparatus display information 133. For example, the apparatus display information 133 represents a mode in which, when three sheet discharge apparatus are mounted to the image forming apparatus 101 in a daisy-chain configuration, the sheet discharge apparatus adjacent to the image forming apparatus 101 is arranged as the first sheet discharge apparatus, and then the second sheet discharge apparatus and the third sheet discharge apparatus are sequentially arranged. The apparatus display information 133 is determined based on the combination of the mounted sheet discharge apparatus. The sheet discharge apparatus is arranged to be replaceable with other sheet discharge apparatus. Therefore, the apparatus display information 133 is updated to the latest information as appropriate.

The job management information 134 is one type of information representing the stacking state at the sheet discharge apparatus being the sheet discharge destination. The job management information 134 includes various pieces of information required for generation of a sheet image to be described later. Those pieces of information are updated in real time every time a detection result of a stacking state, which is detected by a detection device to be described later, or information representing a scheduled stacking state is received. The "stacking state" herein refers to presence or absence of a sheet at a sheet stacking portion (including the change in portion at which the sheets are stacked), and the transition of the outer shape and the size of the sheet and the sheet stacking height, that is, refers to all the changes in sheet state until the sheets are collected by an ejecting operation to be described later.

Next, the sheet discharge apparatus to be mounted to the sheet discharge apparatus connection port 123 of the image forming apparatus 101 are described. The sheet discharge apparatus refers to a large-capacity stacker and a finisher, and are apparatus capable of being arbitrarily combined or replaced afterwards. Those sheet discharge apparatus each operate as a sheet stacking unit capable of stacking and collecting the sheets for each image forming job. That is, each sheet discharge apparatus stacks sheets corresponding to a processed job onto the sheet stacking portion to achieve a sheet bundle of each image forming job.

Figure 2:
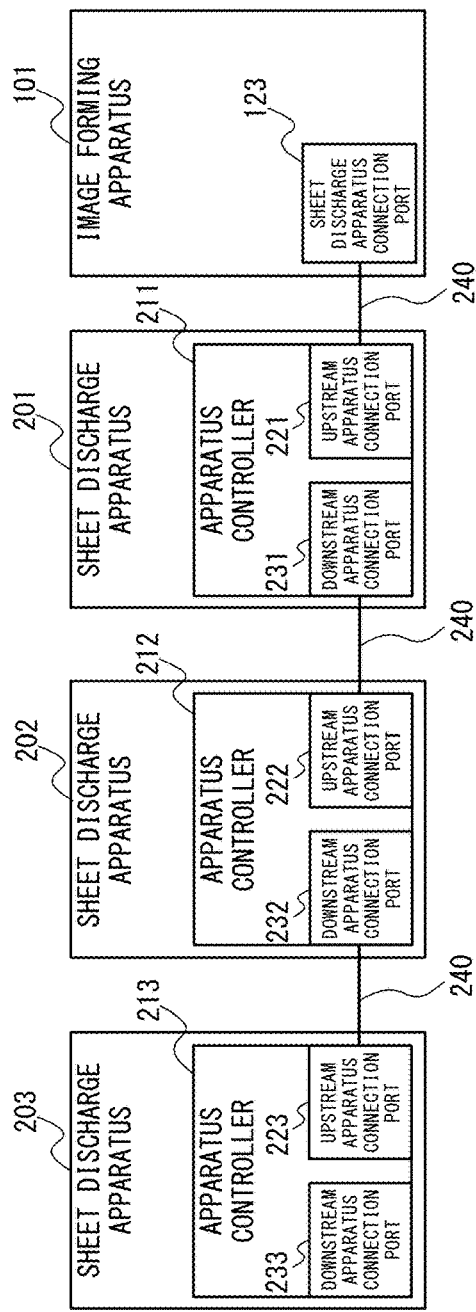
FIG. 2 is a schematic diagram for illustrating a state in which sheet discharge apparatus are mounted to an image forming apparatus.

FIG. 2 is a schematic diagram for illustrating a mounting example in a case where three sheet discharge apparatus 201 to 203 are connected to the sheet discharge apparatus connection port 123 in a daisy-chain configuration. The sheet discharge apparatus 201 to 203 include apparatus controllers 211, 212, and 213, respectively, for controlling the operation of each respective apparatus. The apparatus controllers 211, 212, and 213 include upstream apparatus connection ports 221, 222, and 223 and downstream apparatus connection ports 231, 232, and 233, respectively. Each of the upstream apparatus connection ports 221, 222, and 223 is a port for mounting the respective apparatus to an apparatus upstream of the respective apparatus via a communication cable 240. Each of the downstream apparatus connection ports 231, 232, and 233 is a port for mounting the respective apparatus to an apparatus downstream of the respective apparatus via the communication cable 240. In this manner, the image forming apparatus 101 and the three sheets discharge apparatus 201, 202, and 203 can communicate bidirectionally with each other. The third sheet discharge apparatus 203 may be omitted, or another apparatus that can communicate with the image forming apparatus 101 may be mounted downstream of the third sheet discharge apparatus 203.

Figure 3:
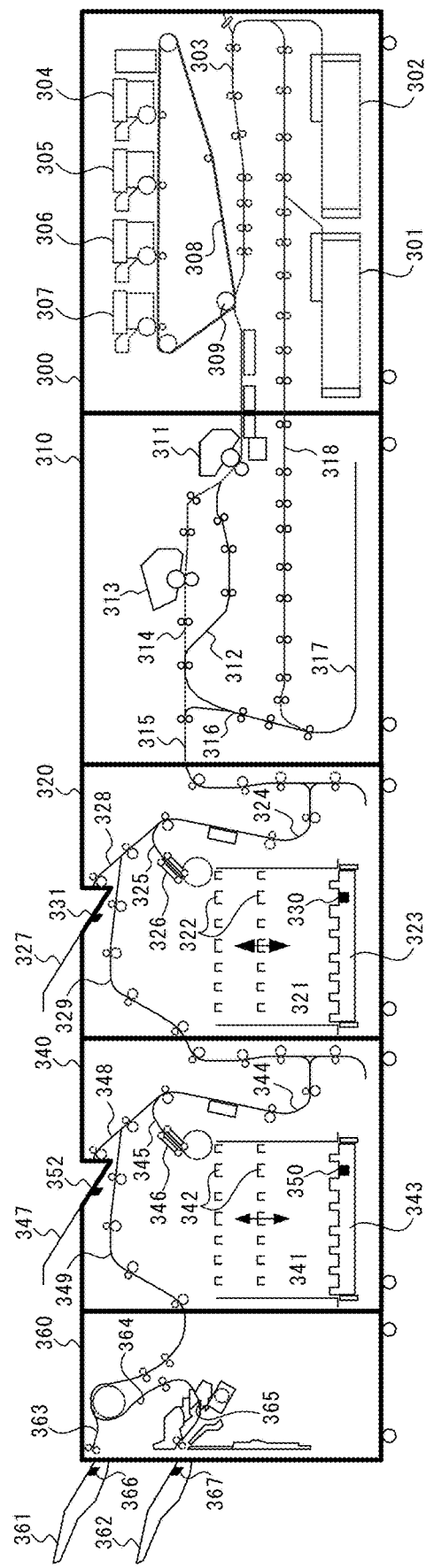
FIG. 3 is a sectional view for illustrating conveyance mechanisms of the image forming system.

Each of the image forming apparatus 101 and the sheet discharge apparatus 201, 202, and 203 includes a sheet conveyance mechanism as a mechanical element. FIG. 3 is an explanatory view for illustrating those conveyance mechanisms. In FIG. 3, an image forming unit 300 is a unit configured to form an image to be transferred onto a sheet, and corresponds to the image forming portion 124 of FIG. 1. An image fixing unit 310 is a unit configured to fix the transferred image. Two large-capacity stackers 320 and 340 and one finisher 360 are mounted to the image fixing unit 310 in a daisy-chain configuration.

In the image forming unit 300, each of sheet feeding decks 301 and 302 separates one uppermost sheet among the received sheets to convey the sheet to a sheet conveyance path 303. Development stations 304 to 307 use toner having colors of yellow (Y), magenta (M), cyan (C), and black (K) to cause adhesion of toner images. The adhering toner images are primarily transferred onto an intermediate transfer belt 308. The intermediate transfer belt 308 rotates, for example, clockwise to convey the sheet to a secondary transfer position 309. At this time, the toner images are transferred onto the sheet conveyed through the sheet conveyance path 303. The sheet having the toner images transferred thereon is conveyed to the image fixing unit 310.

In the image fixing unit 310, a fixing unit 311 melts and pressurizes the toner images to fix the toner images onto the sheet. The sheet that has passed through the fixing unit 311 is conveyed from a sheet conveyance path 312 to a sheet conveyance path 315. Additional heating and pressurization may be required depending on the sheet type. In this case, after the sheet passes through the fixing unit 311, the sheet is conveyed to a second fixing unit 313 with use of a sheet conveyance path in the stage subsequent to the fixing unit 311. The sheet subjected to additional heating and pressurization is conveyed to a sheet conveyance path 314. A reversing portion 316 reverses the conveyed sheet by a switch-back method. When an image is to be formed on one side of the sheet, the reversed sheet, that is, the sheet having an image formed thereon, is conveyed to the sheet conveyance path 315. When images are to be formed on both sides of the sheet, the sheet is conveyed to a duplex reverse path 317, and is reversed to be conveyed to a duplex conveyance path 318. In this manner, an image is formed on the second side at the secondary transfer position 309, and the sheet is conveyed to the sheet conveyance path 315. The sheet that has passed through the sheet conveyance path 315 passes through a sheet conveyance path 324 to be input to the large-capacity stacker 320.

The large-capacity stacker 320 includes a stacking portion 321 including a lift tray 322 and an ejection tray 323, which are each configured to stack sheets. Those trays are controlled by the apparatus controller 211 illustrated in FIG. 2. The lift tray 322 is positioned at a sheet stacking portion having a predetermined height under a state in which no sheets are stacked, and is lowered when the stacking proceeds. The ejection tray 323 is a tray for re-stacking the sheets at a time point at which the lift tray 322 is lowered to a re-stacking position, to thereby eject the sheets to the outside of the apparatus. The lift tray 322 and the ejection tray 323 are formed so that their bars for supporting the sheets are present at alternate positions. Therefore, the sheets on the lift tray 322 can be re-stacked onto the ejection tray 323 without issue.

The sheet passes through the sheet conveyance path 324 and a sheet conveyance path 325 to be conveyed to a sheet discharge unit 326. The sheet discharge unit 326 includes a lower rotary member and an upper rotary member that are configured to nip the sheet, and to discharge the sheet in a flipped manner to the lift tray 322. The action of "discharging the sheet in a flipped manner" refers to an action of discharging the sheet with the front and back sides being reversed so that one of both surfaces of the sheet on a side in contact with the lower rotary member of the sheet discharge unit 326 is turned to become an upper surface on the lift tray 322.

The lift tray 322 is controlled to be lowered by an amount of a height of the stacked sheets as the stacking of the sheets proceeds so that an upper end of the stacked sheets is at a predetermined height. When the lift tray 322 is in a fully-stacked state, the lift tray 322 is lowered to the position of the ejection tray 323. The "fully-stacked state" refers to a state in which the sheets reach a maximum stackable amount of the lift tray 322 and no more sheets can be stacked on the lift tray 322. Then, at a time point at which the lift tray 322 reaches the re-stacking position that is lower than the ejection tray 323, the sheets are re-stacked onto the ejection tray 323. After that, the ejection tray 323 is carried to the outside of the apparatus. In this manner, the sheets are removable. This operation is called "ejecting operation".

The large-capacity stacker 320 further includes a top tray 327. The top tray 327 is one sheet stacking portion mainly used for outputting a sample of the sheets to be stacked on the stacking portion 321. During discharge of the sheets to the stacking portion 321, one sheet (or one bundle) is output to the top tray 327 as a sample. In this manner, the quality of the image formation can be checked without taking out the sheets stacked in the stacking portion 321. When a sheet is to be output to the top tray 327, the sheet passes through the sheet conveyance path 324 and a sheet conveyance path 328 to be conveyed to the top tray 327. When a sheet is conveyed to an apparatus downstream of the large-capacity stacker 320, the sheet is conveyed through a sheet conveyance path 329.

The ejection tray 323 and the top tray 327 include sheet presence/absence detection sensors 330 and 331, respectively. The sheet presence/absence detection sensors 330 and 331 operate as one type of detection unit configured to detect the change in stacking state of the sheets on the tray at every predetermined timing. The controller 121 receives the detection results of the sheet presence/absence detection sensors 330 and 331 in time series, and updates the job management information 134 in the storage 122 based on the received detection results.

The large-capacity stacker 340 has the same configuration as that of the large-capacity stacker 320. That is, the stacking portion 321 (lift tray 322 and ejection tray 323) of the large-capacity stacker 320 corresponds to a stacking portion 341 (lift tray 342 and ejection tray 343) of the large-capacity stacker 340. Similarly, the sheet conveyance paths 324, 325, 328, and 329 and the sheet discharge unit 326 of the large-capacity stacker 320 correspond to sheet conveyance paths 344, 345, 348, and 349 and a sheet discharge unit 346 of the large-capacity stacker 340, respectively. Further, the top tray 327 and the sheet presence/absence detection sensors 330 and 331 of the large-capacity stacker 320 correspond to a top tray 347 and sheet presence/absence detection sensors 350 and 351 of the large-capacity stacker 340, respectively. Those components are controlled by the apparatus controller 212.

The finisher 360 subjects the conveyed sheet to predetermined post-processing under the control of the apparatus controller 213 illustrated in FIG. 2 based on the function designated by the operator. As an example of the post-processing, in the first embodiment, the sheet is subjected to stapling (one-portion or two-portion binding) and punching (two or three holes). The finisher 360 includes two sheet discharge trays 361 and 362 each serving as a sheet stacking portion. To the sheet discharge tray 361, a sheet not to be subjected to post-processing, for example, stapling, is discharged through a sheet conveyance path 363. To the sheet discharge tray 362, a sheet subjected to a finishing function designated by the operator is discharged through sheet conveyance paths 364 and 365.

Each of the sheet discharge trays 361 and 362 is configured to be arbitrarily raised or lowered. It is also possible to perform such an operation that the sheet discharge tray 361 is lowered so that a plurality of sheets subjected to post-processing are stacked onto the sheet discharge tray 361. The sheet discharge trays 361 and 362 include sheet presence/absence detection sensors 366 and 367, respectively, which are each configured to detect the stacking state of the sheets on the tray. The sheet presence/absence detection sensors 366 and 367 also operate as one type of detection unit configured to detect the change in stacking state of sheets on the tray at every predetermined timing. The detection results are transmitted to the image forming apparatus 101 in time series by the apparatus controllers included in the large-capacity stackers 320 and 340.

Figure 4:
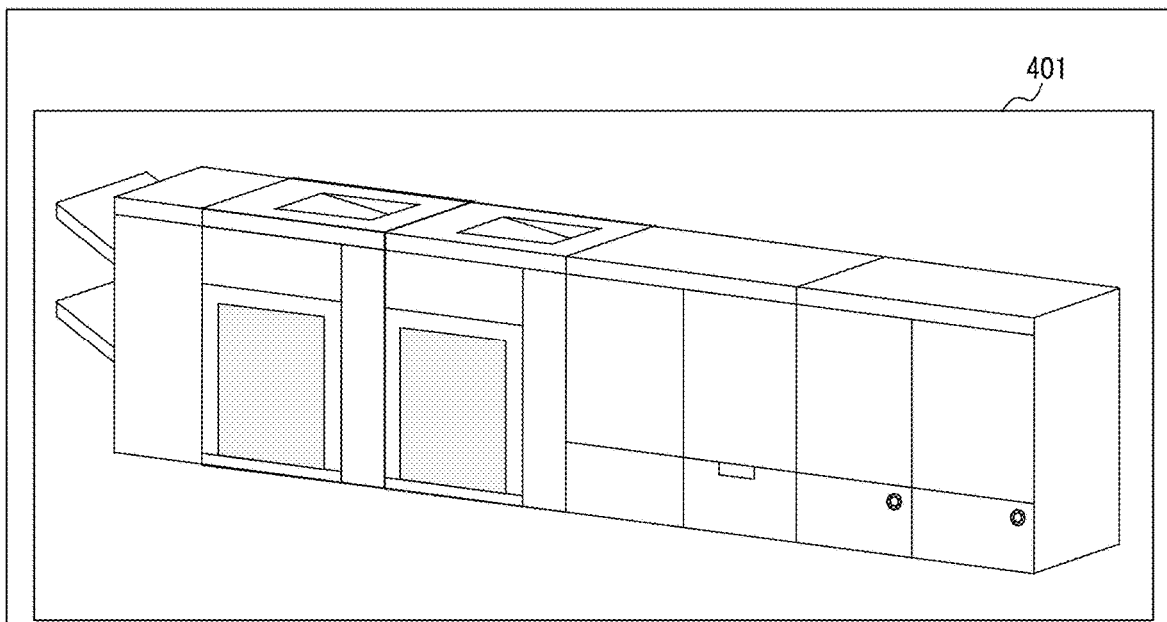
FIG. 4 is a diagram of apparatus display information.

FIG. 4 is an exemplary diagram of a screen to be displayed on the display 113 of the information processing apparatus 100 when a job is processed in the image forming apparatus 101. The display content of the screen is generated by the controller 111 based on the apparatus display information 133 received from the image forming apparatus 101. Alternatively, the controller 121 of the image forming apparatus 101 may generate the display content.

The content of the apparatus display information 133 differs depending on the combination of the sheet discharge apparatus. In the first embodiment, for the sake of convenience of description, it is assumed that the apparatus display information 133 corresponding to all combinations of mountable sheet discharge apparatus is stored in advance. As an example, a description is given of an example of the apparatus display information 133 corresponding to the apparatus configuration exemplified in FIG. 3. A schematic diagram is used in FIG. 4, however the actual apparatus display information 133 is stored in a form of an extensible markup language (XML) or comma-separated values (CSV), for example.

The upper stage of FIG. 4 represents a configuration image that visualizes the configuration of the plurality of sheet discharge trays and other portions. In the first embodiment, the upper stage of FIG. 4 expresses the overall arrangement mode in, for example, a bitmap format so as to visualize the overall arrangement mode. The visualized overall arrangement mode is hereinafter referred to as "overall image 401". The lower stage of FIG. 4 represents a table in which information on the position of the sheet discharge tray included in each sheet discharge apparatus is stored. The overall image 401 can be displayed as a two-dimensional image or a three-dimensional image, but is displayed as a three-dimensional image in this case. A sheet or a sheet bundle is not shown in the overall image 401 illustrated at the upper stage of FIG. 4, but when a sheet is conveyed, a structure image of the sheet discharge tray at the stacking portion for the sheet is also rendered (visualized or displayed). For example, there is displayed an overall image 401 including a structure image representing a lift tray 322 and an ejection tray 323 that are displaced in the above-mentioned large-capacity stackers 320 and 340. In the example illustrated in FIG. 3, each of the large-capacity stackers 320 and 340 includes three sheet discharge trays (top tray, lift tray, and ejection tray), and the finisher 360 includes two sheet discharge trays (upper tray and lower tray). Therefore, in such an arrangement mode, a total of eight sheet discharge trays are usable. In the overall image 401 at the upper stage of FIG. 4, an actual arrangement mode and structure images of those sheet discharge apparatus and sheet discharge trays are displayed. Therefore, the operator can intuitively recognize which sheet discharge tray the sheets are stacked on to be collectable.

In the table shown at the lower stage of FIG. 4, each of trays #1 to #8 corresponds to a sheet discharge apparatus 421 to which each tray is installed, a tray type 422, tray position coordinates 423, and supportable sheet information 424. That is, it is shown in the table that the tray #1 is the top tray of the large-capacity stacker 320, the tray #1 is provided at tray position coordinates (396, 102) with reference to the overall image 401, and the tray #1 can support sheets having a size of 13×19 and a basis weight of 400 g/m$^2$. The tray position coordinates are offset values (pixel numbers) in a right direction and a lower direction with the upper left of the overall image 401 serving as an origin. The other trays #2 to #8 have similar content.

Figure 5:
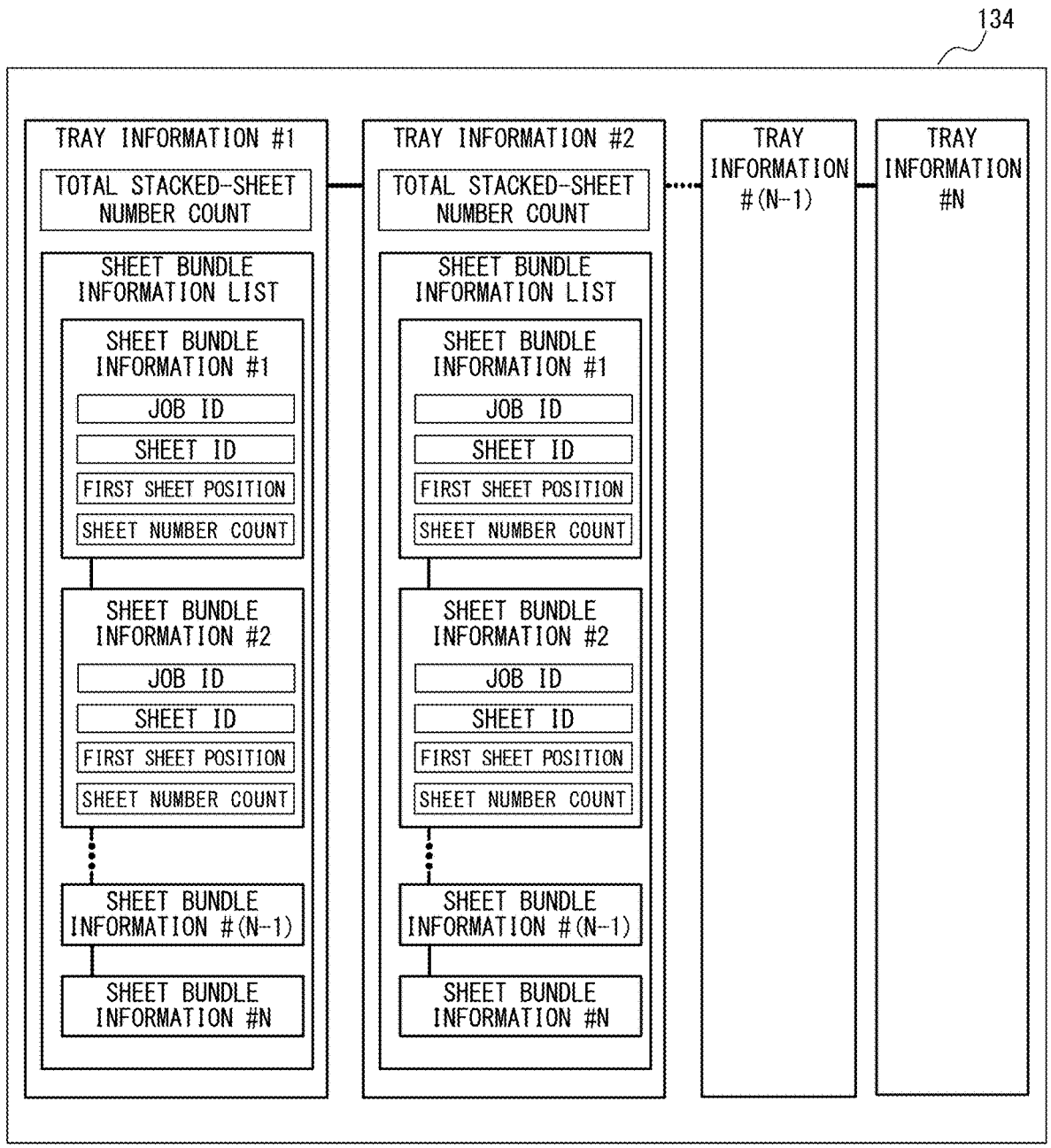
FIG. 5 is a diagram of job management information.

FIG. 5 is a diagram of the job management information 134. The job management information 134 is updated in the storage 122 at a timing at which, for example, the results of detecting the display mode are received at a plurality of positions in each sheet discharge tray, and can be referred to as appropriate. The job management information 134 has list-type data structure. That is, tray information representing the sheet stacking state or the sheet-bundle stacking state in the available sheet discharge tray for each tray is represented as tray information #1 to tray information #N. In the relationship with the table shown at the lower stage of FIG. 4, the detection result of the above-mentioned stacking state in the tray #1 corresponds to the tray information #1. The same applies to the tray information #2, the tray information #(N−1), and the tray information #N. N is a natural number, and N is 8 in the case of the apparatus configuration illustrated in FIG. 3.

In FIG. 5, the tray information #1 to the tray information #8 have a data format having a "total stacked-sheet number count" and a "sheet bundle information list" as member variables. The "total stacked-sheet number count" is a variable for counting a total number of sheets stacked on the sheet discharge tray. In the "sheet bundle information list", pieces of sheet bundle information each representing information on each sheet bundle are arranged in a list in the stacking order of the sheets. When no sheets are stacked on any sheet discharge tray, the "sheet bundle information list" is an empty list. Each piece of sheet bundle information has, as member variables, a "job ID", a "sheet ID", a "first sheet position", and a "sheet number count". The "job ID" is a variable representing an ID of a printing job corresponding to the sheet bundle. Each printing job is allocated with a unique ID by the image forming apparatus 101, and the ID is recorded in the member variable. The "sheet ID" is a variable representing an ID of the sheet corresponding to the sheet bundle. The sheet is defined based on characteristics such as a size, a basis weight, and states of the front and back surfaces, and a sheet ID allocated to identify the sheet is recorded in the member variable. The "first sheet position" is a variable representing what number the first sheet of the sheet bundle corresponds to when counted from the first sheet stacked on the sheet discharge tray. The "sheet number count" is a variable for counting the total number of sheets of the sheet bundle.

Figure 6:
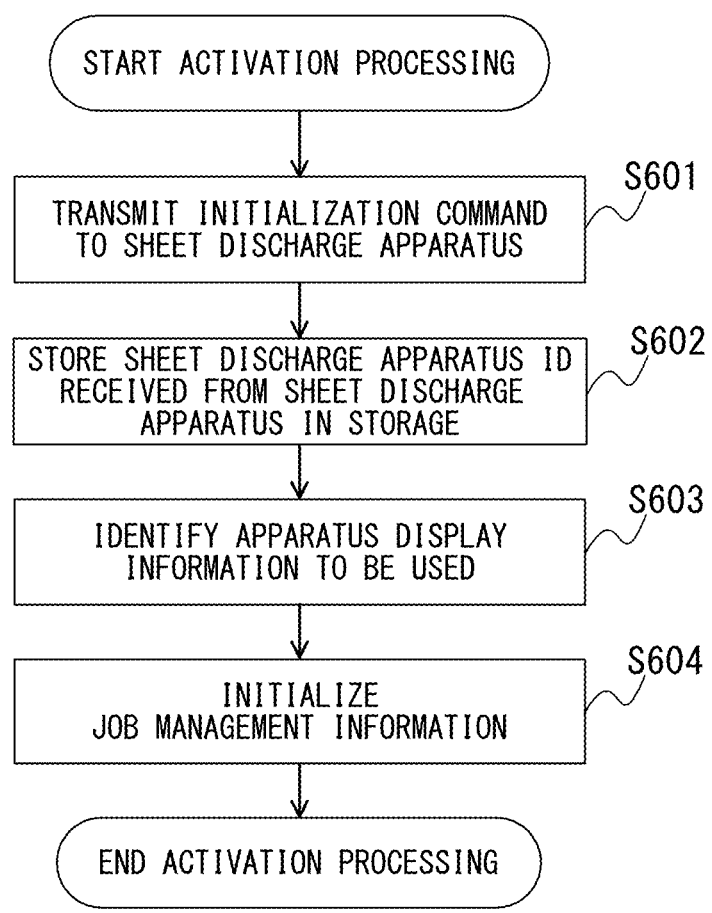
FIG. 6 is a control flow for illustrating an operation procedure at the time when the image forming apparatus is activated.

Next, an exemplary operation of the image forming system 1 in the first embodiment is described. First, the operation of the image forming apparatus 101 at the time of activation thereof is described with reference to FIG. 6. FIG. 6 is a control flow of the operation to be executed when the image forming apparatus 101 is activated. This control flow is executed by the controller 121 controlling each portion in the image forming apparatus 101.

When the image forming apparatus 101 is activated, the controller 121 transmits an initialization command to all of the mounted sheet discharge apparatus (Step S601). The initialization command is transmitted to each sheet discharge apparatus via the communication cable. When each sheet discharge apparatus receives the initialization command, each sheet discharge apparatus transmits back to the image forming apparatus 101 the sheet discharge apparatus ID for identifying the type of the sheet discharge apparatus.

The controller 121 stores the received sheet discharge apparatus ID in the storage 122 (Step S602). With the sheet discharge apparatus ID, it can be recognized how the sheet discharge apparatus mounted to the image forming apparatus 101 are currently arranged (order of the sheet discharge apparatus and the like), and as a result, where the sheet stacking portion is positioned. The controller 121 identifies the apparatus display information 133 corresponding to the arrangement mode of the currently-mounted sheet discharge apparatus based on the stored sheet discharge apparatus ID from the apparatus display information 133 stored in advance in accordance with the combination of the sheet discharge apparatus (Step S603). For example, in the arrangement mode illustrated in FIG. 3, the apparatus display information 133 corresponding to the configuration in which two large-capacity stackers and one finisher are mounted is identified.

After the apparatus display information 133 is identified, the controller 121 initializes the job management information 134 (Step S604). That is, the job management information 134 is newly generated based on the sheet discharge apparatus ID recorded in Step S602. Sheets are not stacked yet on any sheet discharge tray immediately after the image forming apparatus 101 is activated. Therefore, in each piece of tray information of the job management information 134, the total stacked-sheet number count is 0, and the sheet bundle information list is an empty list.

Figure 7:
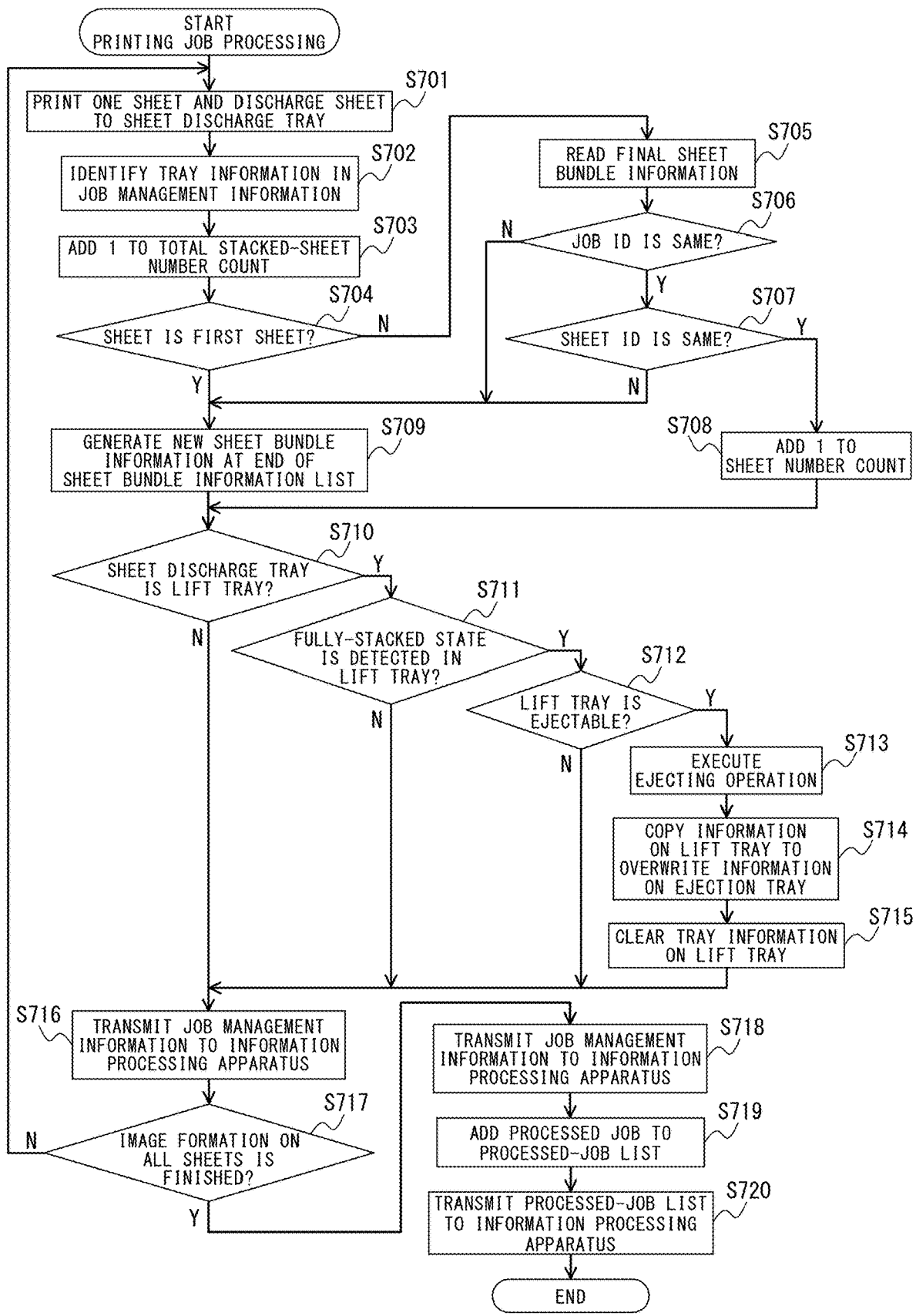
FIG. 7 is a control flow for illustrating a procedure at the time when an image forming job is processed in the image forming apparatus.

Next, with reference to FIG. 7, a description is given of an operation at the time when the image forming apparatus 101 processes the image forming job. It is assumed that the image forming job is received from, for example, the information processing apparatus 100 via the network communication portions 110 and 120. The image forming job includes designation (setting) of tray information on the sheet stacking portion, that is, the sheet discharge apparatus for stacking the sheets having the images formed thereon. In the following description, it is assumed that the tray information (top tray or lift tray 322) on the large-capacity stacker 320 is designated. FIG. 7 is a control flow of the image forming apparatus 101 at this time. This control flow is also executed by the controller 121 integrally controlling the respective portions of the apparatus.

In the image forming apparatus 101, image formation of one sheet is performed in accordance with the image forming job in order of pages designated by the image forming job. After the image formation, the conveyance of the sheet toward the large-capacity stacker 320 designated by the image forming job is started (Step S701). At this time, the controller 121 identifies the tray information on the designated large-capacity stacker 320 (Step S702). The tray information can be identified by referring to the apparatus display information 133. For example, when the tray #1 of the tray information of the table at the lower stage of FIG. 4 is referred to, the tray #1 corresponds to the top tray of the large-capacity stacker 320. Similarly, the tray #2 corresponds to the lift tray 322 of the large-capacity stacker 320. When the tray #2 is designated in the image forming job, the controller 121 refers to the record of the tray #2 as the tray information.

The controller 121 adds 1 to the "total stacked-sheet number count" of the identified tray information (Step S703). The controller 121 further determines whether or not the discharged sheet is the first sheet in the sheet discharge tray based on the "total stacked-sheet number count" (Step S704). When the sheet is not the first sheet (Step S704: N), the controller 121 reads information on the last sheet bundle (hereinafter referred to as "last sheet bundle information") in the "sheet bundle information list" (Step S705). Then, the controller 121 determines whether or not the "job ID" of the job being processed (for which the image formation is performed) is the same as the "job ID" in the sheet bundle information read in Step S705 (Step S706). When the "job ID" is the same (Step S706: Y), the controller 121 determines whether or not the "sheet ID" of the sheet subjected to image formation in Step S701 is the same as the "sheet ID" in the sheet bundle information read in Step S705 (Step S707). When the "sheet ID" is the same (Step S707: Y), the controller 121 adds 1 to the "sheet number count" of the last sheet bundle information in the tray information (Step S708), and the processing proceeds to Step S711.

When the sheet is the first sheet in Step S704 (Step S704: Y), when the "job ID" differs in Step S706 (Step S706: N), or when the "sheet ID" differs in Step S707 (Step S707: N), the controller 121 executes the processing of Step S709. Specifically, new sheet bundle information is added at the end of the sheet bundle information list in the tray information. The member variables of the added new sheet bundle information are as follows. First, the "job ID" is the job ID of the job being processed. The "sheet ID" is a sheet ID corresponding to the sheet subjected to image formation in Step S701. The "total stacked-sheet number count" is input as the "first sheet position". The "sheet number count" becomes 1. The "job name" is a job name of the job being processed. The "sheet discharge finish time" is set as "to be determined" because whether the sheet currently being processed is the final sheet is unknown when sheet bundle information is newly added. After that, the processing proceeds to Step S710.

In Step S710, the controller 121 determines whether or not the sheet discharge tray designated in Step S701 is the lift tray 322 of the large-capacity stacker 320. When the sheet discharge tray is the lift tray 322 (Step S710: Y), the controller 121 determines whether or not the lift tray 322 is brought into the fully-stacked state by the sheets discharged in Step S701 (Step S711). When the lift tray 322 is in the fully-stacked state (Step S711: Y), the controller 121 determines whether or not the lift tray 322 detected to be in the fully-stacked state is ejectable (Step S712). Whether the lift tray 322 is ejectable is determined based on whether or not the sheet bundles are stacked on the ejection tray 323 of the same large-capacity stacker 320. When the sheet bundles are stacked on the ejection tray 323, that is, when the sheet presence/absence detection sensors 330 and 331 detect that the sheet bundles are stacked, the controller 121 determines that the lift tray 322 is not ejectable. Otherwise, the controller 121 determines that the lift tray 322 is ejectable.

When the lift tray 322 is ejectable (Step S712: Y), the controller 121 re-stacks the sheet bundles stacked on the lift tray 322 detected to be in the fully-stacked state in Step S711 onto the ejection tray 323, and executes the ejecting operation (Step S713). After that, the controller 121 copies, in the job management information 134, the tray information on the lift tray 322 for which the ejecting operation of the large-capacity stacker 320 is executed in Step S713, to the tray information on the same large-capacity stacker 320 to overwrite the tray information on the same large-capacity stacker 320 (Step S714). Further, the controller 121 clears, in the job management information 134, the tray information on the lift tray 322 for which the ejecting operation is executed in Step S714 (Step S715). In this case, "clearing the tray information" refers to obtaining an empty sheet bundle information list by setting the "total stacked-sheet number count" in the tray information to 0.

When the sheet discharge tray is not the lift tray 322 (Step S710: N), when the lift tray 322 is not in the fully-stacked state (Step S711: N), or when the lift tray 322 is not ejectable (Step S712: N), the controller 121 transmits the job management information 134 to the information processing apparatus 100 (Step S716). The same is applied after the tray information on the lift tray 322 is cleared (Step S715).

After that, the controller 121 determines whether or not the image formation of all of the sheets by the image forming job is finished (Step S717). When image formation of all of the sheets is finished (Step S717: Y), the controller 121 transmits the job management information 134 to the information processing apparatus 100 (Step S718). Further, the controller 121 adds the job for which processing of all of the sheets is finished to the processed job list 131 (Step S719), and transmits the processed-job list 131 to the information processing apparatus 100 (Step S720). Thus, the series of processing steps is ended.

Figure 8:
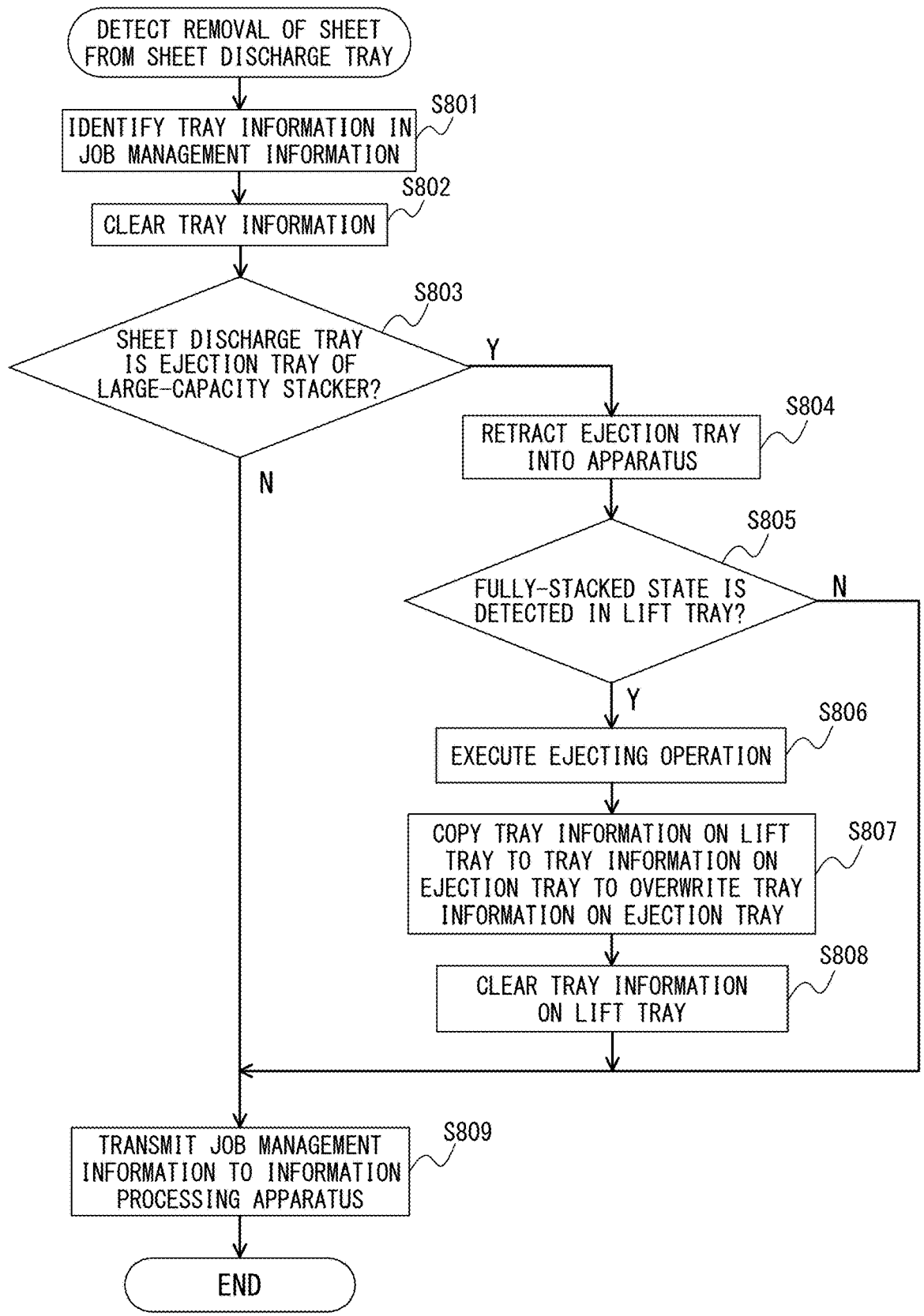
FIG. 8 is a control flow for illustrating a procedure of sheet collection detection processing.

Next, with reference to FIG. 8, a description is given of an operation performed when the collection of sheets from the sheet discharge tray is detected in the image forming apparatus 101. In this case, description is given of an example of a case in which sheets are collected from the ejection tray 323 of the large-capacity stacker 320. FIG. 8 is a control flow for illustrating a procedure at the time when sheet collection detection processing is performed. This control flow is also performed by the controller 121 integrally controlling the respective portions of the apparatus. The sheet collection is detected when a state in which the sheet presence/absence detection sensor 330 detects the stacking state of the sheet bundles is changed to a state in which the stacking state is not detected any more.

The controller 121 refers to the job management information 134 to identify tray information corresponding to the sheet discharge tray at which the sheet collection is detected (Step S801). Then, the controller 121 clears the identified tray information (Step S802). The controller 121 further determines whether or not the sheet discharge tray is the ejection tray 323 of the large-capacity stacker 320 (Step S803). When the sheet discharge tray is the ejection tray 323 (Step S803: Y), the controller 121 retracts the ejection tray 323 into the apparatus (large-capacity stacker 320) (Step S804).

Further, the controller 121 determines whether or not the lift tray 322 of the large-capacity stacker 320 at which the sheet collection is detected is in the fully-stacked state (Step S805). When the lift tray 322 is in the fully-stacked state (Step S805: Y), the controller 121 executes the ejecting operation of re-stacking the sheets stacked on the lift tray 322 in the fully-stacked state onto the ejection tray 323 (Step S806). Then, the controller 121 copies, in the job management information 134, the tray information on the lift tray 322 for which the ejecting operation is executed, to the tray information on the ejection tray 323 of the large-capacity stacker 320 to overwrite the tray information on the ejection tray 323 (Step S807). After that, the controller 121 clears, in the job management information 134, the tray information on the lift tray 322 for which the ejecting operation is executed (Step S808). When the sheet discharge tray corresponding to the empty tray information is not the ejection tray 323 (Step S803: N), the controller 121 transmits the job management information 134 to the information processing apparatus 100 (Step S809), and ends the series of processing steps. The same processing is performed when the lift tray 322 is not in the fully-stacked state (Step S805: N) and after the tray information on the lift tray 322 is cleared in Step S808.

Figure 9:
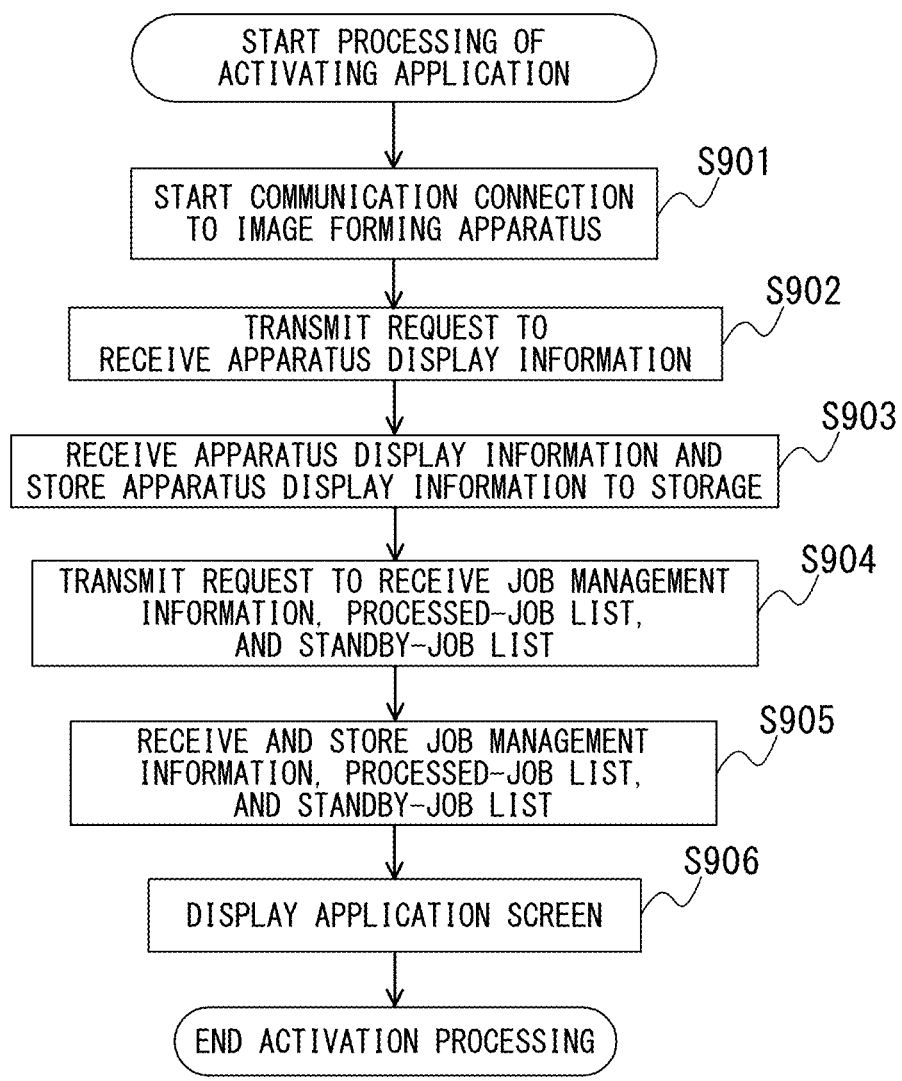
FIG. 9 is a control flow for illustrating an operation procedure of an information processing apparatus.

The operator can recognize the above-mentioned stacking state of each sheet discharge apparatus mounted to the image forming apparatus 101 as required via an application on which the computer program for apparatus control is executed in the information processing apparatus 100. The operation of the information processing apparatus 100 at this time is described with reference to FIG. 9. FIG. 9 is a control flow for illustrating processing of activating an application. This control flow is executed by the controller 111 integrally controlling the respective portions of the apparatus.

When an application is activated in the information processing apparatus 100, the controller 111 starts communication connection to the image forming apparatus 101 (Step S901). The "communication connection" refers to continuous establishment of a communication path until the operator inputs a clear cancel instruction. When the communication path is established, a request to receive the apparatus display information 133 is transmitted to the image forming apparatus 101 (Step S902). When the image forming apparatus 101 receives this acquisition request, the image forming apparatus 101 transmits the apparatus display information 133 corresponding to the current arrangement mode. When the apparatus display information 133 is updated while the communication connection is established, the image forming apparatus 101 transmits the updated apparatus display information 133 to the information processing apparatus 100. When the information processing apparatus 100 receives the updated apparatus display information 133 from the image forming apparatus 101, the information processing apparatus 100 stores the apparatus display information 133 in the storage 112 (Step S903).

The controller 111 further transmits a request for the job management information, the processed-job list, and the standby job list to the image forming apparatus 101 (Step S904). When the image forming apparatus 101 (controller 121) receives the request, the image forming apparatus 101 (controller 121) transmits the job management information 134 and the processed-job list 131 that are currently stored to the information processing apparatus 100. The controller 111 stores the job management information 134, the processed-job list 131, and the standby job list 132 received from the image forming apparatus 101 to the storage 112 (Step S905). Next, the controller 111 generates a monitor screen based on the stored apparatus display information 133, job management information 134, processed-job list 131, and standby job list 132 to display the monitor screen on the display 113 (Step S906).

Figure 10:
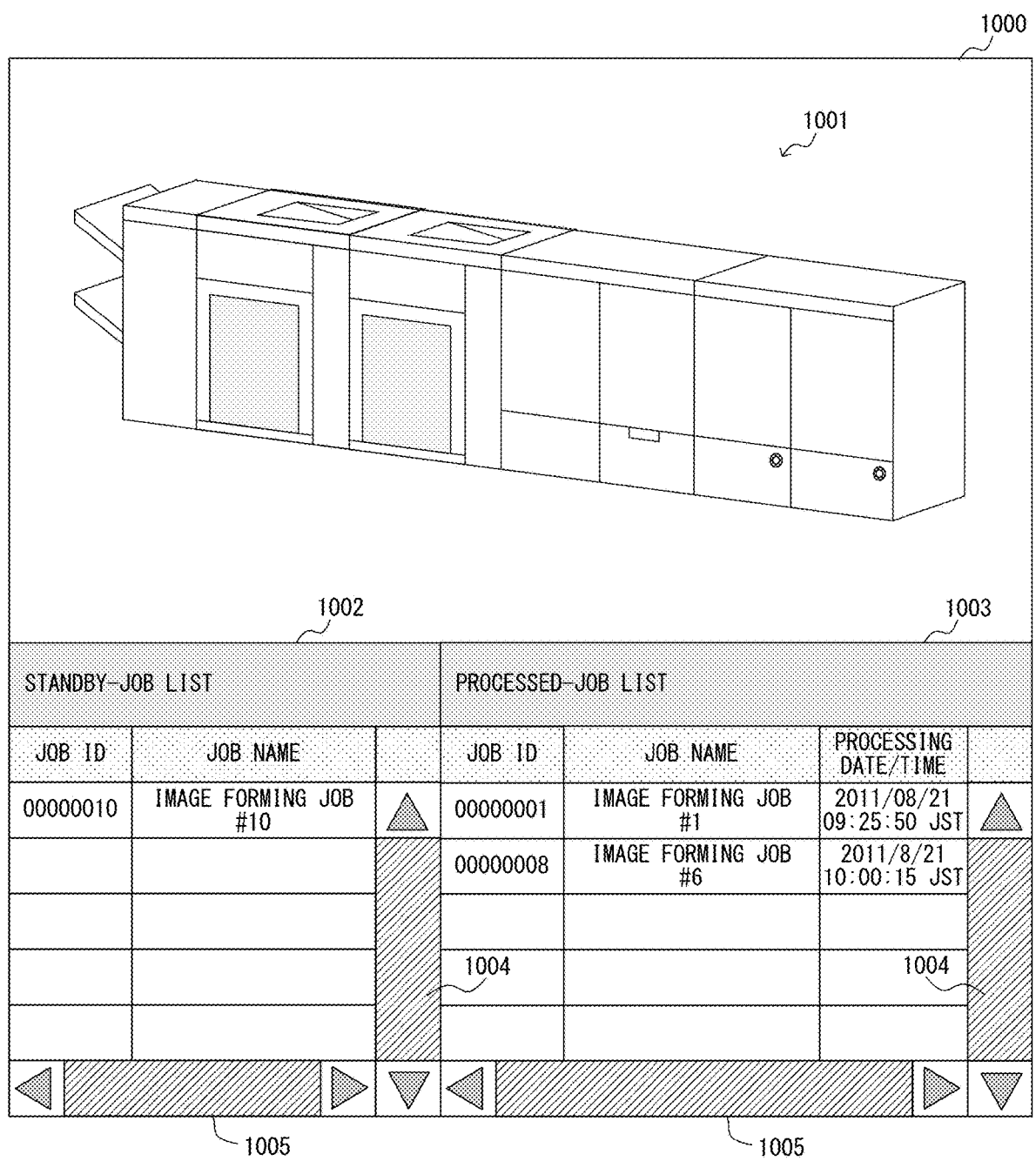
FIG. 10 is a diagram of a monitor screen.

An example of the monitor screen is illustrated in FIG. 10. In a monitor screen 1000 exemplified in FIG. 10, an image region 1001, a standby job list region 1002, and a processed-job list region 1003 are formed in the illustrated layout. The image region 1001 is a region for visually displaying the overall image and the above-mentioned sheet stacking state, and has a two-display-layer structure. Specifically, the image region 1001 includes a first display layer for displaying the overall image, and a second display layer for mapping a sheet image at the sheet stacking portion of the overall image on the first display layer.

In the first display layer, an overall image (overall image 401 illustrated in FIG. 4) generated based on the apparatus display information 133 stored in Step S903 is displayed (rendered to be visualized). In the second display layer, a sheet image generated in accordance with the above-mentioned stacking state in each sheet discharge tray based on the job management information 134 received by the information processing apparatus 100 is displayed (rendered to be visualized). The display of the sheet image is updated in real time at a timing at which the change of the stacking state is detected. That is, the controller 111 is configured so that the mode of displaying the sheet image on the display 113 can be changed in real time in accordance with the execution of each image forming job.

In the example of FIG. 10, the overall image 1001 in a state in which no sheet bundle is stacked on the sheet discharge tray is displayed. In the standby job list region 1002, the standby job list received by the information processing apparatus 100 from the image forming apparatus 101 is displayed. The standby job list without any reference numeral refers to a list obtained by visualizing the standby job list 132. In the standby-job list, at least one job attribute (job ID, job name) of the standby job is displayed. When no standby job is selected, the sheet bundle (sheet image) can be displayed in the order represented in the standby job list. In the first embodiment, the job ID and the job name are displayed, however, when a lateral scroll bar 1005 is provided, other job attributes such as the number of pages and the number of bundles can be displayed.

In the processed-job list region 1003, the processed-job list received by the information processing apparatus 100 from the image forming apparatus 101 is displayed. The processed-job list without any reference numeral refers to a list obtained by visualizing the processed-job list 131. In the processed-job list, at least one job attribute (job ID, job name, processing date/time) of the processed job is displayed. In the first embodiment, the job ID, the job name, and processing date/time are displayed, however, when the lateral scroll bar 1005 is provided, other job attributes such as the number of pages and the number of bundles can be displayed. The controller 111 allows the sheet image to be displayed in the order represented in the processed-job list. Further, the controller 111 allows the sheet image corresponding to the designated processed job to be displayed in a distinguished manner from the sheet images corresponding to other processed jobs.

The operator can operate the input portion 114 to selectively designate any processed job on the processed-job list. Further, similarly, the operator can selectively designate any standby job on the standby job list. When the number of jobs listed in the processed-job list or the standby job list is larger than the number of jobs that can be displayed at one time in the standby job list region 1002 or the processed-job list region 1003, a scroll bar 1004 is used. The operator can operate the scroll bar 1004 to select any processed job. The selected processed job and standby job are displayed in a highlighted (emphasized) manner to be distinguished from processed jobs other than the selected processed job and standby jobs other than the selected standby job.

Figure 11:
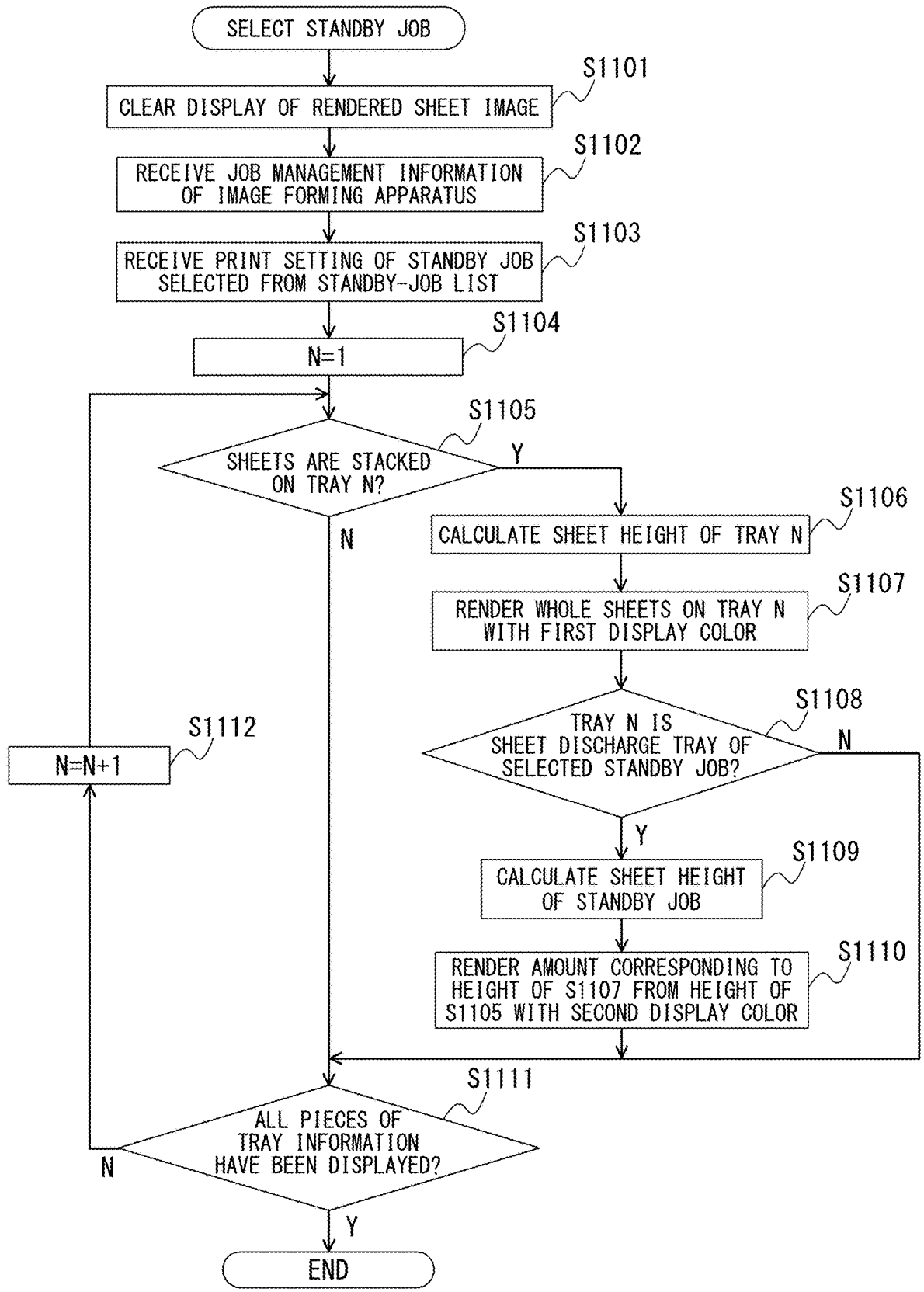
FIG. 11 is a control flow for illustrating a procedure in a case in which a standby job is selected from a list.

Next, a description is given of an operation example of a case in which the image forming apparatus 101 receives the job management information 134, and one standby job in the standby job list region 1002 is selected. FIG. 11 is a control flow to be executed by the controller 111 of the information processing apparatus 100 at this time.

In FIG. 11, the controller 111 deletes the display of the sheet image displayed in the second display layer of the image region 1001 (Step S1101). Next, the controller 111 receives the job management information 134 of the image forming apparatus 101 (Step S1102). Further, the controller 111 receives a print setting (job attribute) of the selected standby job from the standby-job list (Step S1103).

Next, the controller 111 substitutes 1 for a variable N representing the stacking order of the sheet discharge tray (Step S1104), and then determines whether or not the sheets are stacked on the tray N in the job management 134 information (Step S1105). When the "total stacked-sheet number count" in the tray information N is 0, it is determined that no sheets are stacked. When the sheets are stacked (Step S1105: Y), the controller 111 calculates a height of the sheet bundle stacked on the tray N (Step S1106). In this case, when the entire sheet bundle stacked on the tray N is to be displayed, the pixel of the height of the sheet bundle is calculated. The height of the sheet bundle is calculated by multiplying the "total stacked-sheet number count" of the tray information N by a predetermined coefficient P. The coefficient P is a coefficient representing the pixel corresponding to the height of one sheet. When the height of the sheet bundle includes a decimal value as a result of calculation, the value is rounded up to an integer value. When no sheets are stacked on the tray N (Step S1105: N), the processing proceeds to Step S1111.

After the height of the sheet bundle is calculated, the controller 111 renders the entire sheet bundle on the tray N with a first display color (Step S1107). After that, the controller 111 refers to a sheet discharge destination setting of the print setting of the selected standby job, which is received in Step S1103, and determines whether or not the tray N is the tray that is set in the sheet discharge destination setting that has been referred to (Step S1108). When the tray N matches the sheet discharge tray of the sheet discharge destination setting of the selected standby job (S1108: Y), the controller 111 calculates the height of the sheet bundle of the selected standby job based on the print setting received in Step S1103 (Step S1109). Next, the controller 111 renders an amount corresponding to the height of the sheet bundle calculated in Step S1109 from the height of the sheet bundle calculated in Step S1106 with a second display color, which is different from the first display color (Step S1110). When the tray N does not match the sheet discharge tray of the sheet discharge destination setting of the selected standby job (Step S1108: N), the processing proceeds to Step S1111.

Next, the controller 111 determines whether or not all pieces of tray information in the received job management information 134 have been displayed (Step S1111). When the display is not finished yet (Step S1111: N), the controller 111 adds 1 to the variable N (Step S1112), and the processing returns to Step S1105. When the display of all pieces of tray information is finished (Step S1111: Y), the controller 111 ends the series of processing steps related to the display of the sheet bundle.

Figure 12:
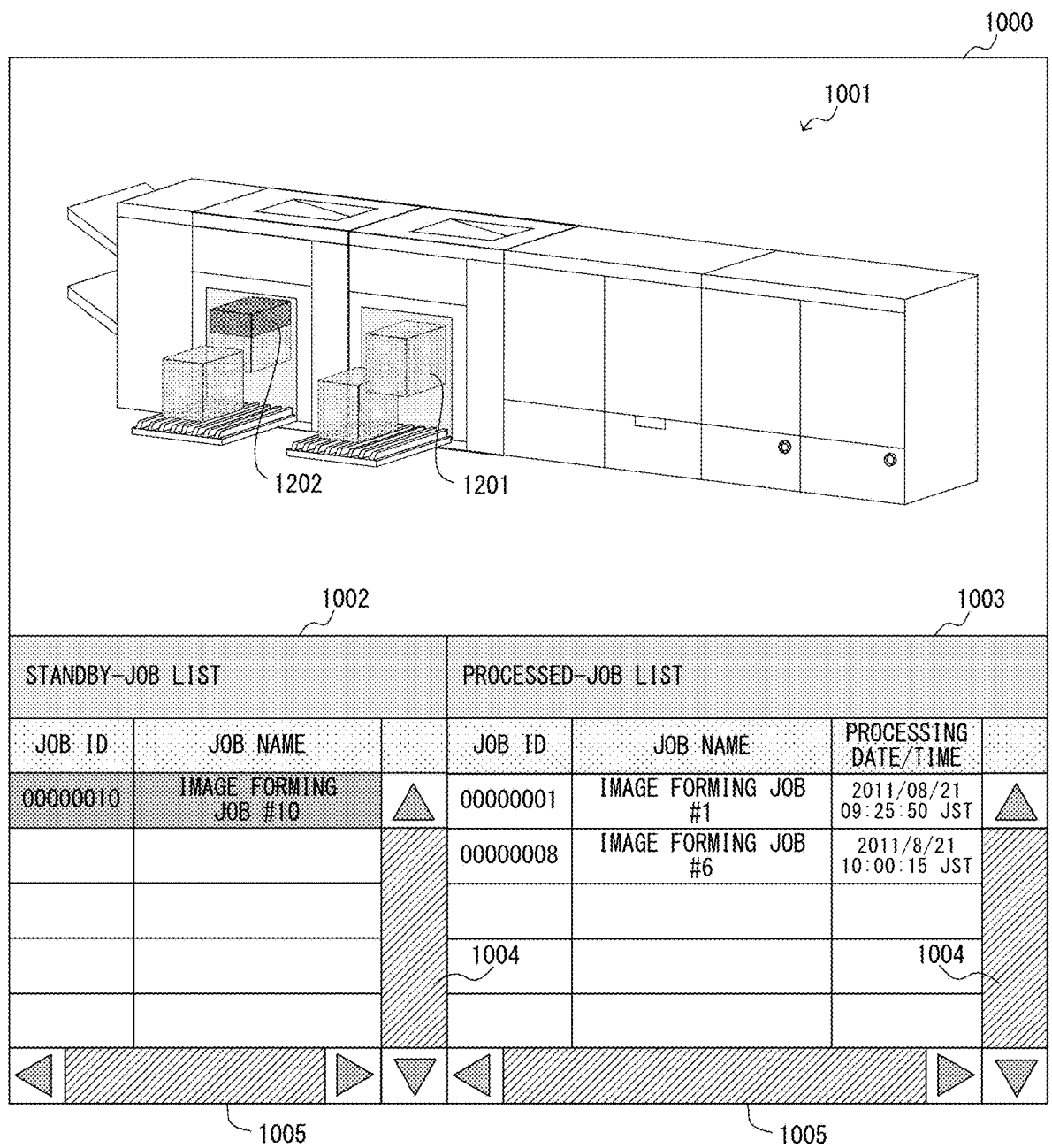
FIG. 12 is a diagram of a monitor screen obtained after the standby job is selected from the list.

FIG. 12 is a diagram of the monitor screen 1000 at the time when one standby job in the standby job list region 1002 is selected. Reference numerals in FIG. 12 are the same as those shown in FIG. 10. In the image region 1001, sheet images 1201 and 1202 are mapped and displayed on the overall image. The sheet image 1201 is an image obtained by the controller 111 in Step S1107 by displaying the sheet bundle stacked on each tray with the first display color. The sheet image 1201 is a sheet image corresponding to the "image forming job #1" and the "image forming job #6" displayed in the processed-job list region 1003.

The sheet image 1202 is an image obtained by the controller 111 in Step S1110 by displaying the sheet bundle of the selected standby job on the tray that is set as the sheet discharge destination setting of the selected standby job with the second display color, which is different from the first display color. The sheet image 1202 is displayed at a position of a scheduled sheet discharge destination of the "image forming job #10" when the "image forming job #10" displayed in the standby job list region 1002 is selected by the operator.

Figure 13:
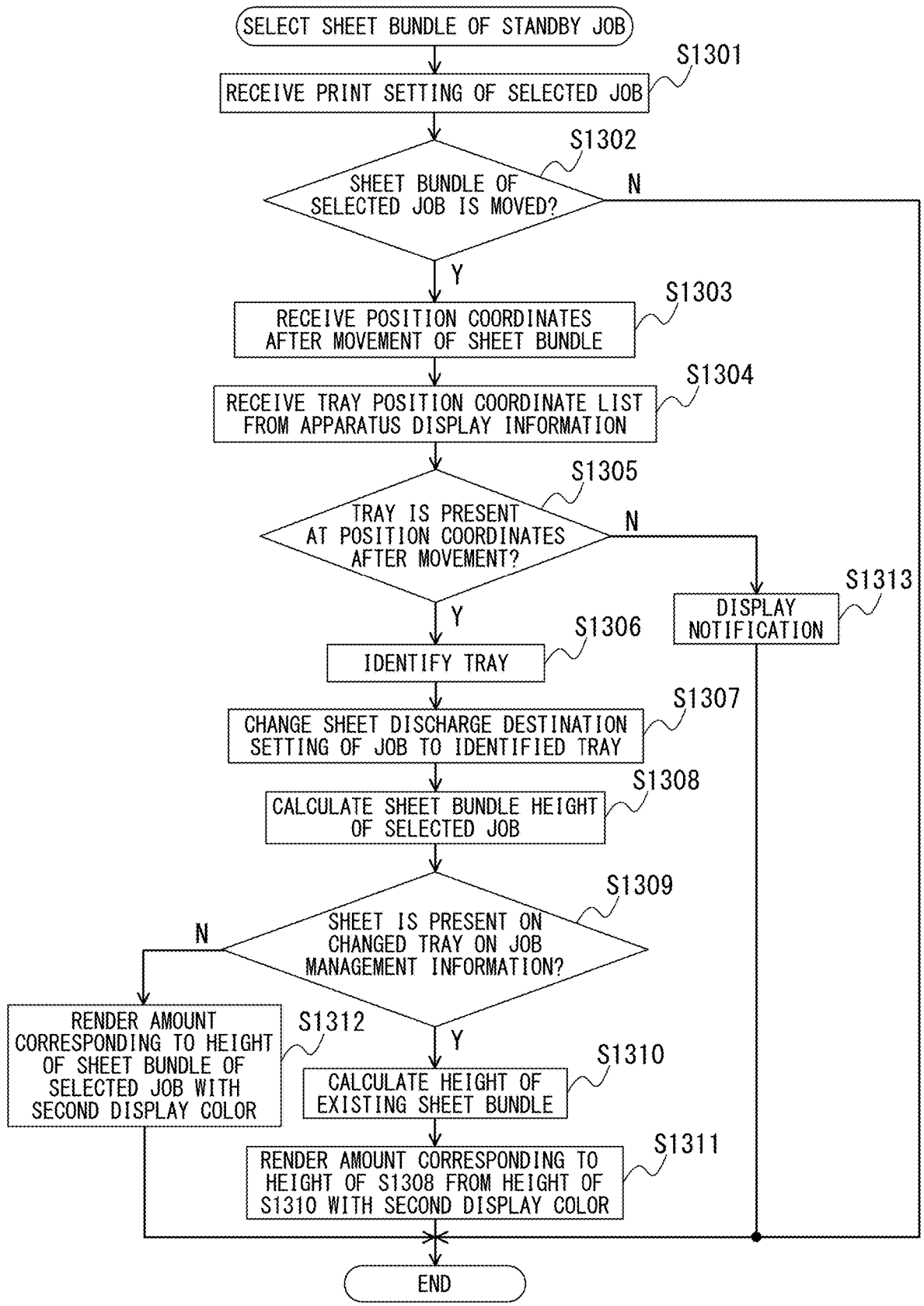
FIG. 13 is a control flow for illustrating a procedure in a case in which a sheet bundle of the selected standby job is moved.

In the first embodiment, the sheet image corresponding to the standby job can be moved through the screen operation. Further, during display of such a sheet image, when the sheet image is moved through the screen operation performed with respect to the sheet image, the job attribute is changed to the content after the movement. The movement destination of the sheet image is a portion of the overall image at which the tray of any sheet discharge apparatus is displayed, but the movement destination may be the surrounding of the portion. The sheet image can be moved through, for example, a drag-and-drop operation. FIG. 13 is a control flow to be executed by the controller 111 of the information processing apparatus 100 at this time.

In FIG. 13, the controller 111 receives the print setting of the selected standby job from the standby job list (Step S1301). Next, the controller 111 determines whether or not the sheet bundle (sheet image, the same holds true in the following) corresponding to the selected standby job is moved by being dragged and dropped from the current display position on the image region 1001 (Step S1302). When the sheet bundle is not moved by being dragged and dropped from the current display position (Step S1302: N), the series of processing steps is ended.

When the sheet bundle is moved by being dragged and dropped from the current display position (Step S1302: Y), the controller 111 receives the position coordinates after the movement of the sheet bundle (Step S1303). Next, the controller 111 receives the position coordinate list 423 of each tray from the apparatus display information 133 (Step S1304). Then, the controller 111 compares the position coordinates of the sheet bundle after the movement, which are received in Step S1303, with the position coordinate list 423 of each tray, which is received in Step S1304, to determine whether or not a tray is present at the position of the sheet bundle after the movement (Step S1305). When this determination is made, even when the position coordinates of the sheet bundle do not completely match the position coordinates of the tray, an error of the position coordinates is allowed to some extent. That is, the position coordinates may be at the surrounding of the tray. The operator can set this tolerance error in advance.

When there is no tray at the position of the sheet bundle after the movement (Step S1305: N), the controller 111 displays a notification that "there is no tray at this position" (letters, symbols, or a combination thereof) in the image region 1001 (Step S1313). At this time, without displaying the notification, the sheet bundle that has been attempted to be moved may be returned to the originally-displayed position before the movement. After the notification is displayed, the series of processing steps is ended.

When a tray is present at the position of the sheet bundle after the movement (Step S1305: Y), the controller 111 identifies the corresponding tray from the position coordinate list 423 of each tray, which is received in Step S1304 (Step S1306). Next, the controller 111 changes the sheet discharge tray of the sheet discharge destination setting in the print setting of the selected standby job, which is received in Step S1301, to the tray identified in Step S1306 (Step S1307). Further, the controller 111 calculates the height of the sheet bundle of the selected standby job based on the print setting received in Step S1301 (Step S1308).

Further, the controller 111 verifies whether or not the sheet bundle ("first sheet image") corresponding to another image forming job is already present on the tray of the sheet discharge destination setting of the selected standby job, which is changed in Step S1307, based on the job management information 134 (Step S1309). When there is no sheet bundle on the changed tray (Step S1309: N), the controller 111 renders the entire sheet bundle with the second display color by an amount corresponding to the height of the sheet bundle ("second sheet image") of the selected standby job, which is calculated in Step S1308 (Step S1312). The second display color is a color different from the first display color, similarly to the case in which the rendering is performed in Step S1110. After the rendering of the sheet bundle of the selected job is ended, the series of processing steps is ended.

When a sheet bundle is present on the changed tray (Step S1309: Y), the controller 111 calculates the height of the existing sheet bundle based on the job management information 134 (Step S1310). Next, the controller 111 renders the entire sheet bundle by an amount corresponding to the height of the sheet bundle of the selected job, which is calculated in Step S1308, from the height of the existing sheet bundle, which is calculated in Step S1310, with the second display color (Step S1311). The second display color is a color different from the first display color, similarly to the case in which the rendering is performed in Step S1110. After the rendering of the sheet bundle of the selected job is ended, the series of processing steps is ended.

Figure 14A:
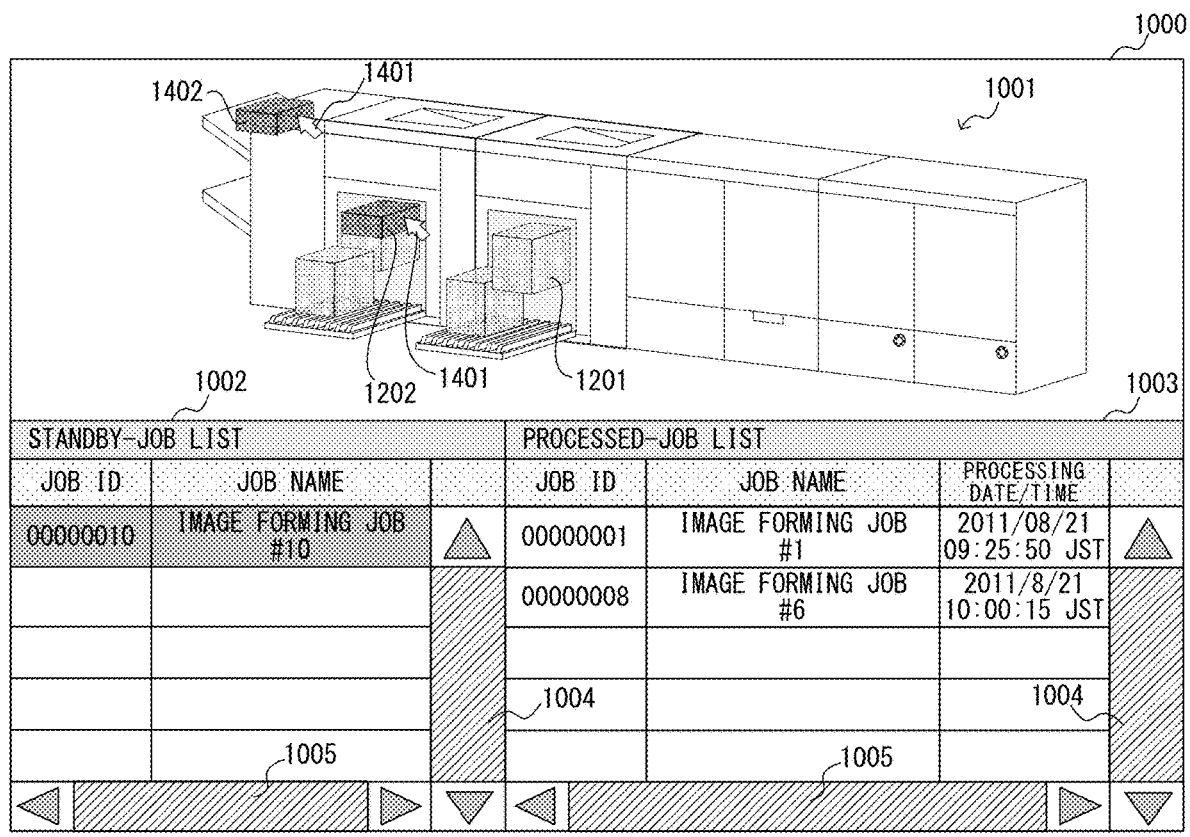
FIG. 14A and FIG. 14B are explanatory diagrams of the control flow of FIG. 13.
Figure 14B:
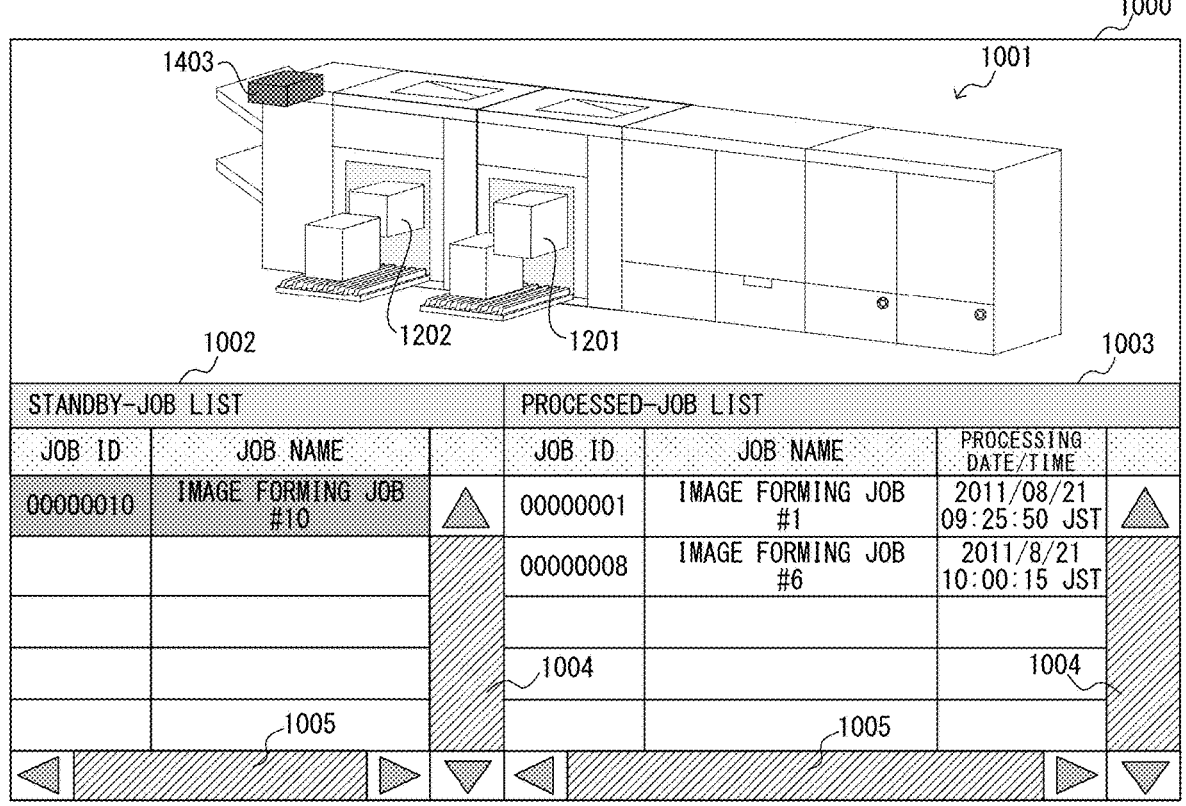

FIG. 14A and FIG. 14B are explanatory diagrams for illustrating an example of the content of the control flow of FIG. 13. In FIG. 14A and FIG. 14B, the same parts as those illustrated in FIG. 12 are denoted by the same reference numerals. FIG. 14A represents a state in which the operator positions a mouse pointer 1401 to the sheet bundle 1202 of the selected standby job, and then drags and drops the sheet bundle 1202 to move the sheet bundle 1202. In this example, the sheet bundle 1202 is moved from the tray #5 to the tray #7. FIG. 14B represents a state after the drop operation, that is, a state after the movement of the sheet bundle 1202. A sheet bundle 1403 is the sheet bundle of the selected standby job, which is rendered after the tray of the sheet discharge destination setting is changed. The tray has been changed, and hence the sheet bundle 1202 that has been displayed before the change of the tray is deleted.

As described above, according to the first embodiment, the operator is only required to move the sheet bundle 1202 of the standby job displayed in the image region 1001 to any tray to change the content of the sheet discharge destination setting of the standby job, that is, the sheet discharge tray. With this operation, while a large number of sheets are discharged to various locations at high speed, the available sheet discharge destination can be recognized, and the sheet discharge destination of the image forming job to be processed can be easily changed. Further, the operator is not required to memorize the place or the name of the changed sheet discharge tray when the sheet discharge destination is changed, and can intuitively change the sheet discharge destination of the standby job.

Second Embodiment

In the first embodiment, the sheet bundle 1202 of the selected standby job is moved through, for example, the drag-and-drop operation, and when a tray is present at the position after the movement, the tray of the sheet discharge destination setting of the standby job is changed. However, not all trays have the same performance. It is desired that the tray of the sheet discharge destination setting be changed in consideration of the size and the basis weight of the dischargeable sheet for each tray.

In view of the above, in a second embodiment of this disclosure, a description is given of an example of a case in which the supportable sheet information on the tray is also considered when the sheet bundle of the selected standby job is to be moved. The configurations of the image forming apparatus and the information processing apparatus are the same as those in the first embodiment.

Figure 15:
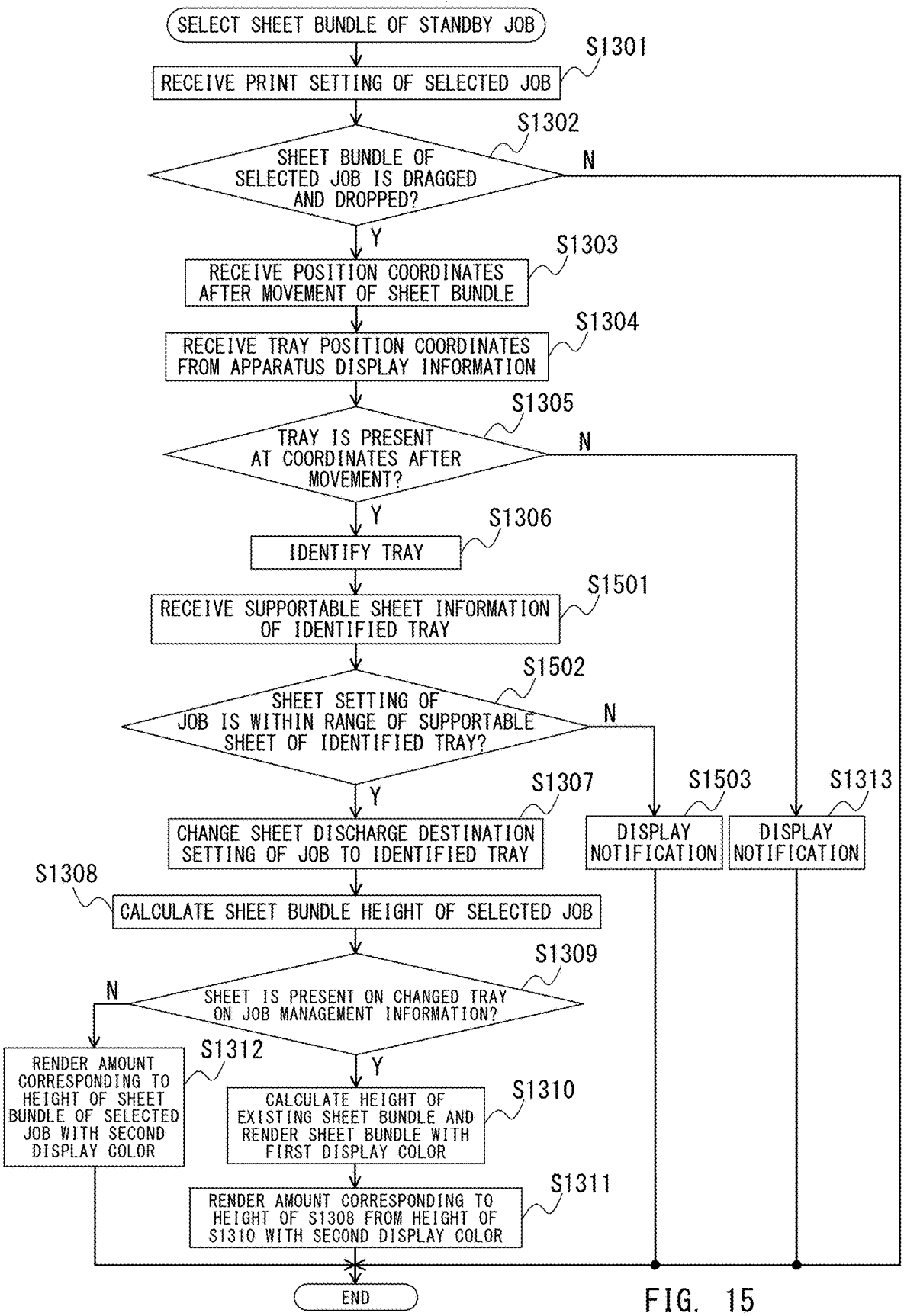
FIG. 15 is a control flow for illustrating a procedure in a case in which the sheet bundle of the selected standby job is moved.

FIG. 15 is a control flow in the second embodiment, which is to be executed by the controller 111 of the information processing apparatus 100. The processing from Step S1301 to Step S1306 and Step S1313 is the same as that in FIG. 13, and hence description thereof is omitted herein. In the second embodiment, the controller 111 receives the supportable sheet information on the tray identified in Step S1306 from the supportable sheet information list 424 of the apparatus display information 133 illustrated in FIG. 4 (Step S1501). Next, the controller 111 compares the sheet setting (setting information such as the sheet size and the basis weight) in the print setting of the standby job, which is received in Step S1301, with the supportable sheet information received in Step S1501. Then, the controller 111 determines whether or not the sheet setting of the job is within the range of the supportable sheet of the tray, that is, whether or not the sheet setting of the job is supportable (Step S1502).

When the sheet setting of the selected job is outside of the range of the supportable sheet of the identified tray (Step S1502: N), the controller 111 displays a notification with the content such as "Please confirm sheet setting of job" (Step S1503). After the notification is displayed, the series of processing steps is ended. When the sheet setting of the selected job is within the range of the supportable sheet of the identified tray (Step S1502: Y), the processing proceeds to Step S1307. The processing from Step S1307 to Step S1312 is the same as that in FIG. 13, and hence description thereof is omitted herein.

Figure 16:
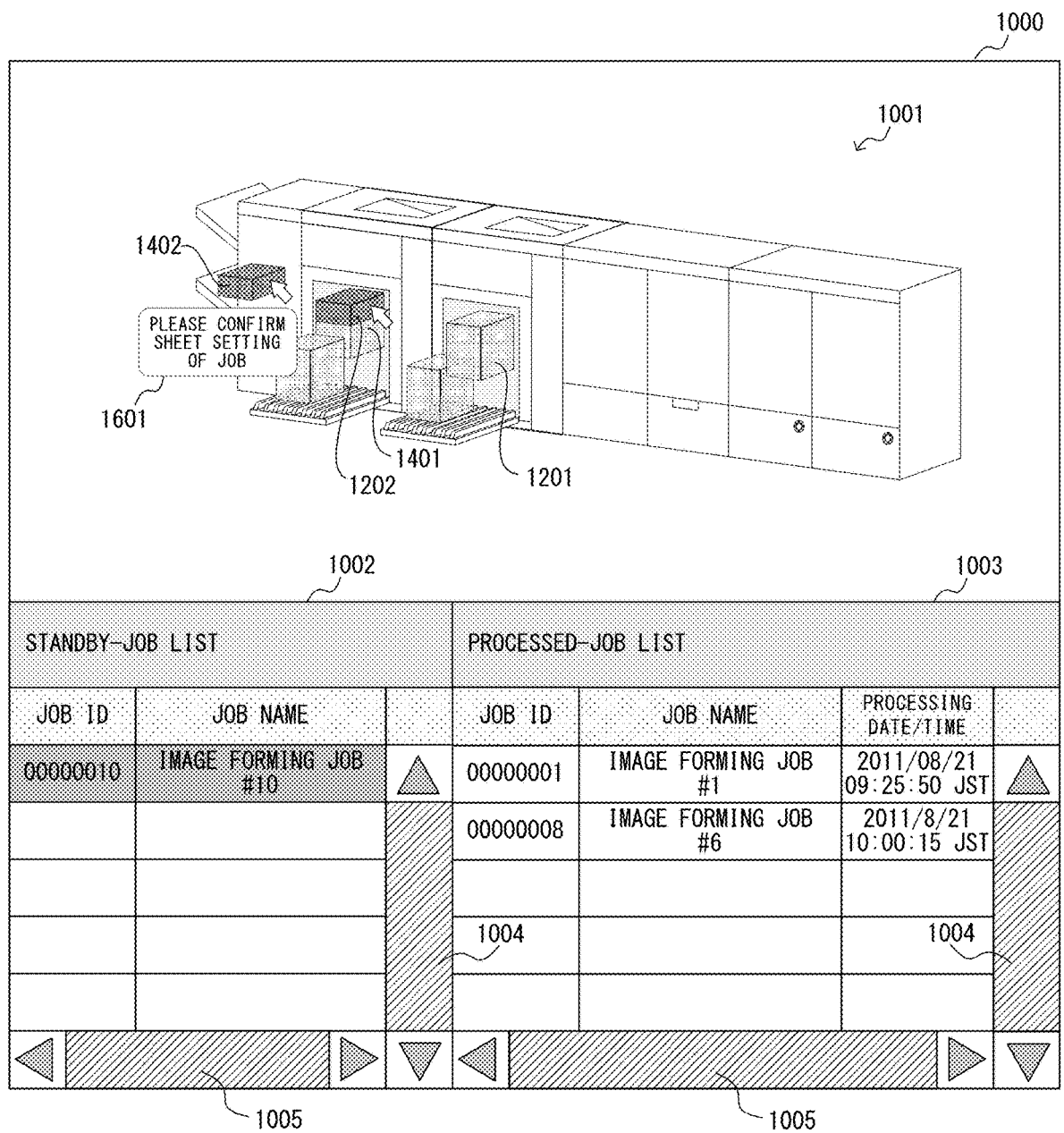
FIG. 16 is a diagram of a monitor screen obtained after the sheet bundle of the selected standby job is moved.

FIG. 16 is a diagram of the monitor screen 1000 at the time when the sheet bundle of the selected standby job, which is displayed in the image region 1001, is moved to one tray, and the sheet discharge destination setting of the standby job is attempted to be changed in consideration of also the supportable sheet information on the tray. The display layout of the monitor screen 1000 is the same as that in the first embodiment. FIG. 16 represents an example of a case in which the setting of the selected standby job is outside of the range of the supportable sheet information on the tray to which the setting is attempted to be changed. That is, the sheet bundle (sheet image) 1202 of the standby job having the sheet setting of "size: 13×19" and "weight: 350 g/m$^2$" is attempted to be moved from the tray #5 to the tray #8, to thereby change the tray of the sheet discharge destination setting. In FIG. 16, the sheet image 1401 is an image representing the sheet bundle before the movement, and the sheet image 1402 is an image representing the sheet bundle after the movement. The point that the sheet images 1401 and 1402 are displayed with the second display color is the same as that in the first embodiment.

In the supportable sheet information list 424 of the apparatus display information 133 illustrated in FIG. 4, the supportable sheet information 424 of the tray #5 is "size: 13×19" and "weight: 400 g/m$^2$". Therefore, the tray #5 can stack the sheet bundle of the selected standby job. However, the supportable sheet information on the tray #8 to which the setting is attempted to be changed through movement of the sheet image 1401 is, with reference to FIG. 4, "size: A3" and "weight: 300 g/m$^2$". Therefore, the tray #8 cannot stack the sheet bundle of the selected standby job. In the second embodiment, in this case, a notification message 1601 for urging the operator to confirm the sheet setting of the selected job is displayed. In this example, a message "Please confirm sheet setting of job" is only displayed, but a message for urging the operator to confirm an item for which the information that is outside of the supportable range is set may be displayed.

As described above, according to the second embodiment, when the sheet bundle 1202 of the selected standby job is selected and moved to any tray, the tray of the sheet discharge destination setting of the selected standby job can be changed in consideration of also the supportable sheet information on the tray. In this manner, the operator is not required to recognize the supportable sheet information on the tray being the sheet discharge destination, and can intuitively change the sheet discharge destination in accordance with the state. Further, it is possible to reduce the possibility that a sheet bundle unsupportable by the tray is stacked.

As described above, according to at least one embodiment of the present disclosure, the sheet discharge destination determined in advance by the image forming job in the image forming apparatus can be easily changed. The present disclosure can also be implemented by executing the following processing. Specifically, a computer program (program for the information processing apparatus and program for the image forming apparatus) for implementing the functions of the first embodiment described above is supplied to an apparatus or a system including the apparatus via a network or various storage media. Then, a computer of the apparatus or the system reads out the above-mentioned computer program to execute the computer program. In this case, the computer program and the storage medium having the computer program stored thereon are encompassed in the present disclosure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-195878, filed Oct. 17, 2018, which is hereby incorporated by reference herein in its entirety.

What is claimed is:

1. An image forming apparatus, comprising:
   an image forming unit configured to form an image on a sheet in accordance with an image forming job;
   a plurality of sheet stacking units, on each of which sheets having images formed thereon, which are discharged from the image forming unit, are to be stacked;
   a memory configured to store a job attribute including a sheet discharge destination of the sheets having the images formed thereon;
   a receiving unit configured to receive a screen operation performed on a display device; and
   a controller,
   the controller being configured to:
      generate a configuration image by visualizing a configuration of the plurality of sheet stacking units;
      generate a sheet image by visualizing the job attribute of any image forming job;
      display the configuration image and the sheet image on the display device; and
      change, when a predetermined screen operation for moving the sheet image to a portion of the configuration image at which one of the plurality of sheet stacking units is displayed is received as the screen operation performed with respect to the displayed sheet image, the sheet discharge destination included in the job attribute to the one of the plurality of sheet stacking units to which the sheet image is moved.

2. The image forming apparatus according to claim 1, wherein the predetermined screen operation is a screen operation for moving, in a screen, the displayed sheet image to a portion of the configuration image at which any one of the plurality of sheet stacking units is displayed.

3. The image forming apparatus according to claim 2, wherein the screen operation for moving the displayed sheet image is a drag-and-drop operation.

4. The image forming apparatus according to claim 1, wherein the sheet image to be moved is an image representing a sheet bundle to be discharged in response to a standby job, which is arbitrarily selected from the image forming jobs, and for which image formation is yet to be executed.

5. The image forming apparatus according to claim 4, wherein the memory is configured to store a standby job list in which at least one standby job is associated with the sheet discharge destination, and
   wherein the controller is configured to display the standby job list on the display device, and allow the sheet image corresponding to any standby job selected from the standby-job list to be moved.

6. The image forming apparatus according to claim 5, wherein the standby job list is a list in which the job attribute of the standby job is stored in stacking order onto the plurality of sheet stacking units, and wherein the controller is configured to allow, when no standby job is selected, the sheet image to be displayed in order represented in the standby job list.

7. The image forming apparatus according to claim 5, wherein the controller is configured to display the selected standby job in an emphasized manner.

8. The image forming apparatus according to claim 4, wherein the controller is configured to, when a first sheet image corresponding to an image forming job other than the selected standby job is present at one of the sheet discharge destination before the movement and the sheet discharge destination after the movement:
display the first sheet image with a first display color; and
render a second sheet image corresponding to the selected standby job with a second display color, which is different from the first display color.

9. The image forming apparatus according to claim 1, wherein the controller is configured to:
determine whether the job attribute is allowed to be changed through the movement of the sheet image, based on one of apparatus display information and the job attribute; and
perform, when the controller determines that the movement is not allowed, one of displaying of a notification and returning of the sheet image to a position before the movement.

10. The image forming apparatus according to claim 9,
wherein the apparatus display information includes supportable sheet information including a size of a sheet that is supportable by each of the plurality of sheet stacking units,
wherein the job attribute includes setting information on the sheet of the image forming job, and
wherein the controller is configured to determine whether the job attribute is allowed to be changed, based on the supportable sheet information and the setting information.

11. An information processing apparatus, comprising:
a communication unit configured to communicate with an image forming apparatus, the image forming apparatus including:
an image forming unit configured to form an image on a sheet in accordance with an image forming job;
a plurality of sheet stacking units, on each of which sheets having images formed thereon, which are discharged from the image forming unit, are to be stacked;
a memory configured to receive, from the image forming apparatus, a job attribute including a sheet discharge destination of the sheets having the images formed thereon to store received information on the job attribute;
a receiving unit configured to receive a screen operation performed on a display device; and
a controller,
the controller being configured to:
generate a configuration image by visualizing a configuration of the plurality of sheet stacking units;
generate a sheet image by visualizing the job attribute of any image forming job;
display the configuration image and the sheet image on the display device; and
change, when a predetermined screen operation for moving the sheet image to a portion of the configuration image at which one of the plurality of sheet stacking units is displayed is received as the screen operation performed with respect to the displayed sheet image, the sheet discharge destination included in the job attribute to the one of the plurality of sheet stacking units to which the sheet image is moved.

12. A non-transitory computer readable storage medium storing a computer program for causing a computer to operate as a control apparatus for an image forming apparatus, the computer being configured to be connected to a display device and being included in the image forming apparatus, the image forming apparatus including:
an image forming unit configured to form an image on a sheet in accordance with an image forming job; and
a plurality of sheet stacking units, on each of which sheets having images formed thereon, which are discharged from the image forming unit, are to be stacked,
the computer program causing the computer to function as:
a memory configured to store a job attribute including a sheet discharge destination of the sheets having the images formed thereon;
a receiving unit configured to receive a screen operation performed on the display device; and
a controller,
the controller being configured to:
generate a configuration image by visualizing a configuration of the plurality of sheet stacking units;
generate a sheet image by visualizing the job attribute of any image forming job;
display the configuration image and the sheet image on the display device; and
change, when a predetermined screen operation for moving the sheet image to a portion of the configuration image at which one of the plurality of sheet stacking units is displayed is received as the screen operation performed with respect to the displayed sheet image, the sheet discharge destination included in the job attribute to the one of the plurality of sheet stacking units to which the sheet image is moved.

13. A non-transitory computer readable storage medium storing a computer program for causing a computer, which is allowed to communicate with an image forming apparatus including an image forming unit configured to form an image on a sheet in accordance with an image forming job, and a plurality of sheet stacking units, on each of which sheets having images formed thereon, which are discharged from the image forming unit, are to be stacked, to function as:
a memory configured to receive, from the image forming apparatus, a job attribute including a sheet discharge destination of the sheets having the images formed thereon to store received information on the job attribute;
a receiving unit configured to receive a screen operation performed on a display device; and
a controller,
the controller being configured to:
generate a configuration image by visualizing a configuration of the plurality of sheet stacking units;
generate a sheet image by visualizing the job attribute of any image forming job;
display the configuration image and the sheet image on the display device; and
change, when the sheet image is moved through the screen operation performed with respect to the displayed sheet image, the job attribute to a content after the movement.

* * * * *